United States Patent
Lyngsøe et al.

(10) Patent No.: US 11,619,778 B2
(45) Date of Patent: Apr. 4, 2023

(54) SOURCE OF SUPERCONTINUUM RADIATION AND MICROSTRUCTURED FIBER

(71) Applicant: NKT PHOTONICS A/S, Birkerød (DK)

(72) Inventors: Jens Kristian Lyngsøe, Hornbaek (DK); Christian Jacobsen, Virum (DK)

(73) Assignee: NKT PHOTONICS A/S, Birkerød (DK)

( * ) Notice: Subject to any disclaimer, the term of this patent is extended or adjusted under 35 U.S.C. 154(b) by 0 days.

(21) Appl. No.: 17/406,219

(22) Filed: Aug. 19, 2021

(65) Prior Publication Data

US 2021/0382229 A1   Dec. 9, 2021

Related U.S. Application Data

(63) Continuation of application No. 16/913,640, filed on Jun. 26, 2020, now abandoned, which is a
(Continued)

(30) Foreign Application Priority Data

Mar. 25, 2014 (DK) ............................ PA 2014 70146

(51) Int. Cl.
G02B 6/02 (2006.01)
G02B 21/06 (2006.01)
(Continued)

(52) U.S. Cl.
CPC ..... *G02B 6/02357* (2013.01); *G02B 6/02347* (2013.01); *G02B 21/06* (2013.01);
(Continued)

(58) Field of Classification Search
CPC .............. G02B 6/02357; G02B 6/02347; G02B 21/06; G02B 21/0004; G02B 21/0012;
(Continued)

(56) References Cited

U.S. PATENT DOCUMENTS 5,802,236 A   9/1998  Di Giovani et al.
6,990,282 B2  1/2006  Russell et al.
(Continued)

FOREIGN PATENT DOCUMENTS

CN  101788695 A   7/2004
CN   1535389 A   10/2004
(Continued)

OTHER PUBLICATIONS

Office Action (Final Notice of Preliminary Rejection) dated May 17, 2022, by the Intellectual Property Office in corresponding Korean Patent Application No. 10-2016-7029615, and an English Translation of the Office Action. (4 pages).
(Continued)

*Primary Examiner* — Ellen E Kim
(74) *Attorney, Agent, or Firm* — Buchanan Ingersoll & Rooney P.C.

(57) ABSTRACT

A microstructured optical fiber having a length and a longitudinal axis along its length, the finer including a core region capable of guiding light along the longitudinal axis and a cladding region which surrounds the core region, the cladding region comprising a cladding background material and a plurality of cladding features within the cladding background material, the cladding features being arranged around the core region, wherein the cladding region comprises an inner cladding region comprising an innermost ring of cladding features and an outer cladding region comprises outer cladding rings of outer cladding features, the innermost ring consisting of those cladding features being closest
(Continued)

to the core region, wherein the rings of cladding features each comprise bridges of cladding background material separating adjacent features of the ring, wherein the bridges of the innermost ring have an average minimum width (w1), the minimum width of a bridge of a ring being the shortest distance between two adjacent features of the ring; and wherein at least one outer cladding ring has an average minimum width (w2) of bridges that is larger than the average minimum width (w1) of the bridges of the innermost ring. Also described are a cascade optical fiber with at least one fiber as described, as well as a source of supercontinuum radiation.

19 Claims, 18 Drawing Sheets

Related U.S. Application Data continuation of application No. 16/396,802, filed on Apr. 29, 2019, now Pat. No. 10,698,155, which is a continuation of application No. 15/128,697, filed as application No. PCT/DK2015/050066 on Mar. 25, 2015, now Pat. No. 10,274,672.

(51) Int. Cl.
   *G02F 1/35* (2006.01)
   *G02B 21/00* (2006.01)
   *G02B 21/16* (2006.01)

(52) U.S. Cl.
   CPC ...... *G02B 21/0004* (2013.01); *G02B 21/0012* (2013.01); *G02B 21/16* (2013.01); *G02F 1/3528* (2021.01)

(58) Field of Classification Search
   CPC .......................... G02B 21/16; G02B 6/02214; G02B 6/02361; G02B 21/0032; G02F 1/3528
   See application file for complete search history.

(56) References Cited

U.S. PATENT DOCUMENTS

| | | | |
|---|---|---|---|
| 7,174,078 B2 | 2/2007 | Libori et al. | |
| 7,715,674 B2 | 5/2010 | Miyabe et al. | |
| 8,145,023 B2 | 3/2012 | Thomsen | |
| 8,496,331 B2 | 7/2013 | Smith | |
| 8,818,160 B2 | 8/2014 | Chavez-Pirson | |
| 2001/0028775 A1 | 10/2001 | Hasegawa et al. | |
| 2002/0122644 A1 | 9/2002 | Birks et al. | |
| 2003/0165289 A1 | 9/2003 | De Barros et al. | |
| 2004/0105640 A1 | 6/2004 | Hasegawa | |
| 2004/0114897 A1 | 6/2004 | Koshiba et al. | |
| 2005/0069269 A1* | 3/2005 | Libori | G02B 6/03627 385/125 |
| 2005/0265405 A1 | 12/2005 | Mannstadt et al. | |
| 2006/0203507 A1 | 9/2006 | Sander | |
| 2008/0050077 A1* | 2/2008 | Kinoshita | G02B 6/02357 385/125 |
| 2009/0052853 A1 | 2/2009 | Mukasa et al. | |
| 2009/0052854 A1 | 2/2009 | Miyabe et al. | |
| 2009/0159310 A1 | 6/2009 | Borrelli et al. | |
| 2011/0116283 A1 | 5/2011 | Thomsen et al. | |
| 2011/0188825 A1 | 8/2011 | Alkeskjold | |
| 2011/0194812 A1 | 8/2011 | Melin | |
| 2012/0027031 A1* | 2/2012 | Liu | G02B 6/02347 372/6 |
| 2012/0195554 A1 | 8/2012 | Maack | |
| 2012/0288247 A1* | 11/2012 | Tanigawa | G02B 6/02347 385/127 |
| 2013/0114129 A1 | 5/2013 | Alkeskjold | |
| 2014/0066723 A1 | 3/2014 | Horvath et al. | |
| 2014/0180264 A1 | 6/2014 | Diao et al. | |
| 2014/0200566 A1 | 7/2014 | Smith | |
| 2014/0232988 A1 | 8/2014 | Kersting et al. | |
| 2014/0288417 A1 | 9/2014 | Schmidtlin et al. | |
| 2014/0293225 A1 | 10/2014 | Parto et al. | |
| 2014/0333978 A1 | 11/2014 | Hereen et al. | |
| 2015/0080718 A1 | 3/2015 | Nheatley et al. | |

FOREIGN PATENT DOCUMENTS

| | | |
|---|---|---|
| CN | 1624504 A | 6/2005 |
| CN | 1275057 C | 9/2006 |
| CN | 2938146 Y | 8/2007 |
| CN | 102323640 A | 1/2012 |
| CN | 102401934 A | 4/2012 |
| CN | 102782537 A | 11/2012 |
| CN | 102967981 A | 3/2013 |
| EP | 0 810 453 A | 12/1997 |
| EP | 1 353 199 A1 | 10/2003 |
| EP | 1 500 960 A | 1/2005 |
| JP | H1095628 A | 4/1998 |
| JP | 2003-255153 A | 9/2003 |
| JP | 2004177817 A | 6/2004 |
| JP | 2004522195 A | 7/2004 |
| JP | 2006-53331 A | 2/2006 |
| JP | 2006-251801 A | 9/2006 |
| JP | 2007041426 A | 2/2007 |
| JP | 2008501130 A | 1/2008 |
| JP | 2008243953 A | 10/2008 |
| JP | 2009015294 A | 1/2009 |
| JP | 2011027866 A | 2/2011 |
| JP | 2012-168355 A | 9/2012 |
| JP | 5065008 B2 | 10/2012 |
| KR | 10-2001-0014256 A | 2/2001 |
| WO | 99/00685 A1 | 1/1999 |
| WO | 02/088801 A2 | 11/2002 |
| WO | 2003091774 A1 | 11/2003 |
| WO | 2006098471 A | 9/2006 |
| WO | 2009/098519 A1 | 8/2009 |
| WO | 2016/045678 A1 | 3/2016 |
| WO | 2016/095923 A1 | 6/2016 |

OTHER PUBLICATIONS

Office Action (Notice of Preliminary Rejection) dated Oct. 8, 2021, by the Intellectual Property Office in corresponding Korean Patent Application No. 10-2016-7029615, and an English Translation of the Office Action. (15 pages).
Office Action (Second Office Action) dated Jul. 9, 2019, by the China National Intellectual Property Administration in corresponding Chinese Patent Application No. 201580021743.X, and an English Translation of the Office Action. (17 pages).
Office Action (First Office Action—Text of the First Office Action) dated Dec. 3, 2018, by the China National Intellectual Property Administration in corresponding Chinese Patent Application No. 201580021743.X, and an English Translation of the Office Action. (30 pages).
Office Action (Notice of Reasons for Refusal) dated Jan. 15, 2019, by the Japanese Patent Office in Corresponding Japanese Patent Application No. 2016-558867, and an English Translation of the Office Action. (13 pages).
Extended European Search Report dated Oct. 19, 2017, issued by the European Patent Office in corresponding European Application No. 15768142.0 (9 pages).
Chen et al., "Photonic crystal fiber with W-type effective refractive index profile", Optik—International Journal for Light and Electron Optics, (Aug. 2013), vol. 124, No. 16, pp. 2309-2312. (4 pages).
Hai et al., "A Novel Defected Elliptical Pore Photonic Crystal Fiber with Ultra-Flattened Dispersion and Low Confinement Losses", IEICE Transactions on Electronics, (Aug. 2007) vol. E90-C, No. 8, pp. 1627-1633. (7 pages).
Jacobsen et al., "Very low zero-dispersion wavelength predicted for single-mode modified-total-internal-reflection crystal fibre" Journal of Optics A: Pure and Applied Optics (Apr. 23, 2004), vol. 6, No. 6, pp. 604-607. (4 pages).

(56) References Cited

OTHER PUBLICATIONS

Lou et al., "An Ultra-Broadband Single-Polarization Single-Mode Photonic Crystal Fibre" Chinese Physics Letters (Aug. 2005), vol. 22, No. 9, pp. 2302-2304. (3 pages).

Matsui et al., "Single-Mode Photonic Crystal Fiber Design With Ultralarge Effective Area and Low Bending Loss for Ultrahigh-Speed WDM Transmission", Journal of Lightwave Technology (Feb. 15, 2011), vol. 29, No. 4., pp. 511-515. (5 pages).

Monro et al., "Sensing with microstructured optical fibres" Measurement Science and Technology (2001) vol. 12, No. 7, pp. 854-858. (5 pages).

Russell et al., "Photonic Crystal Fibres" IOOC (1997), pp. 63-64. (2 pages).

Danish Search Report and Search Opinion dated Nov. 4, 2014, by the Danish Patent and Trademark Office in corresponding Danish Patent Application PA 2014 70146. (8 pages).

Office Action (Communication pursuant to Article 94(3) EPC) dated Jul. 22, 2020, by the European Patent Office in corresponding European Application No. 15 768 142.0-1230, (8 pages).

Office Action and Search Report dated Dec. 22, 2020, by the National Chisawa Bureau in corresponding Chinese Patent Application No. 201911369332.6, and an English Translation of the Office Action. (19 pages).

Office Action {Notice of Reasons for Refusal) dated Dec. 28, 2020, by the Japanese Patent Office in Corresponding Japanese Patent Application No. 2020-018673, and an English Translation of the Office Action. (8 pages).

Office Action (Notice of Defects in Patent) dated Aug. 12, 2020, by the Israeli Patent Office in corresponding Israeli Patent Application No. 247885, and an English Translation of the Office Action. (13 pages).

Office Action (Second Office Action) dated Sep. 7, 2021 by the China National Intellectual Property Administration in corresponding Chinese Patent Application No. 201911369332.6 and an English Translation of the Office Action. (10 pages).

Office Action (Communication pursuant to Article 94(3) EPC) dated Sep. 7, 2021, by the European Patent Office in corresponding European Application No. 15 768 142.0-1230. (70 pages).

Office Action (Notification of Reason for Refusal) dated Oct. 8, 2021, by the Intellectual Property Office in corresponding Korean Patent Application No. 10-2016-7029615, and an English Translation of the Office Action. (16 pages).

\* cited by examiner

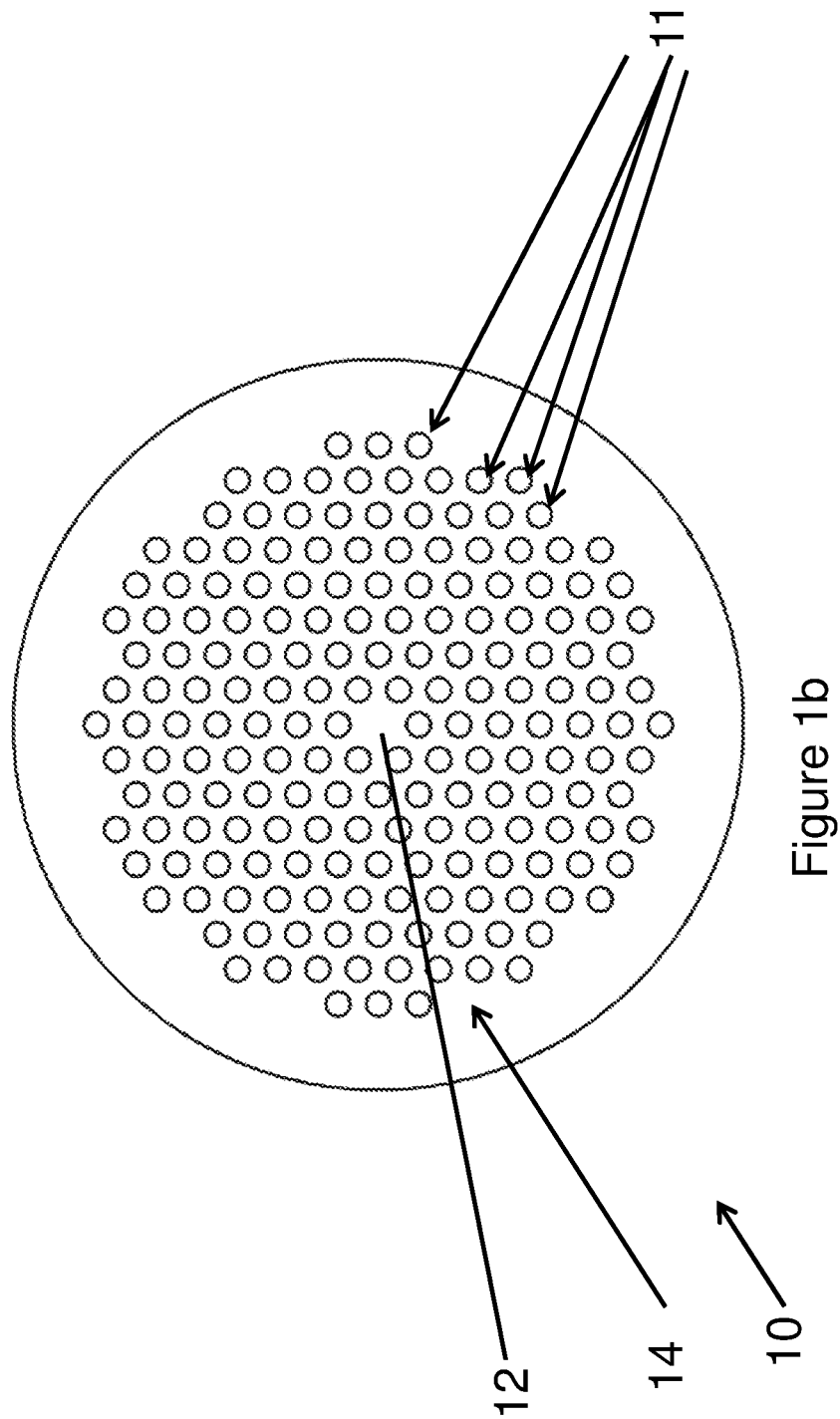

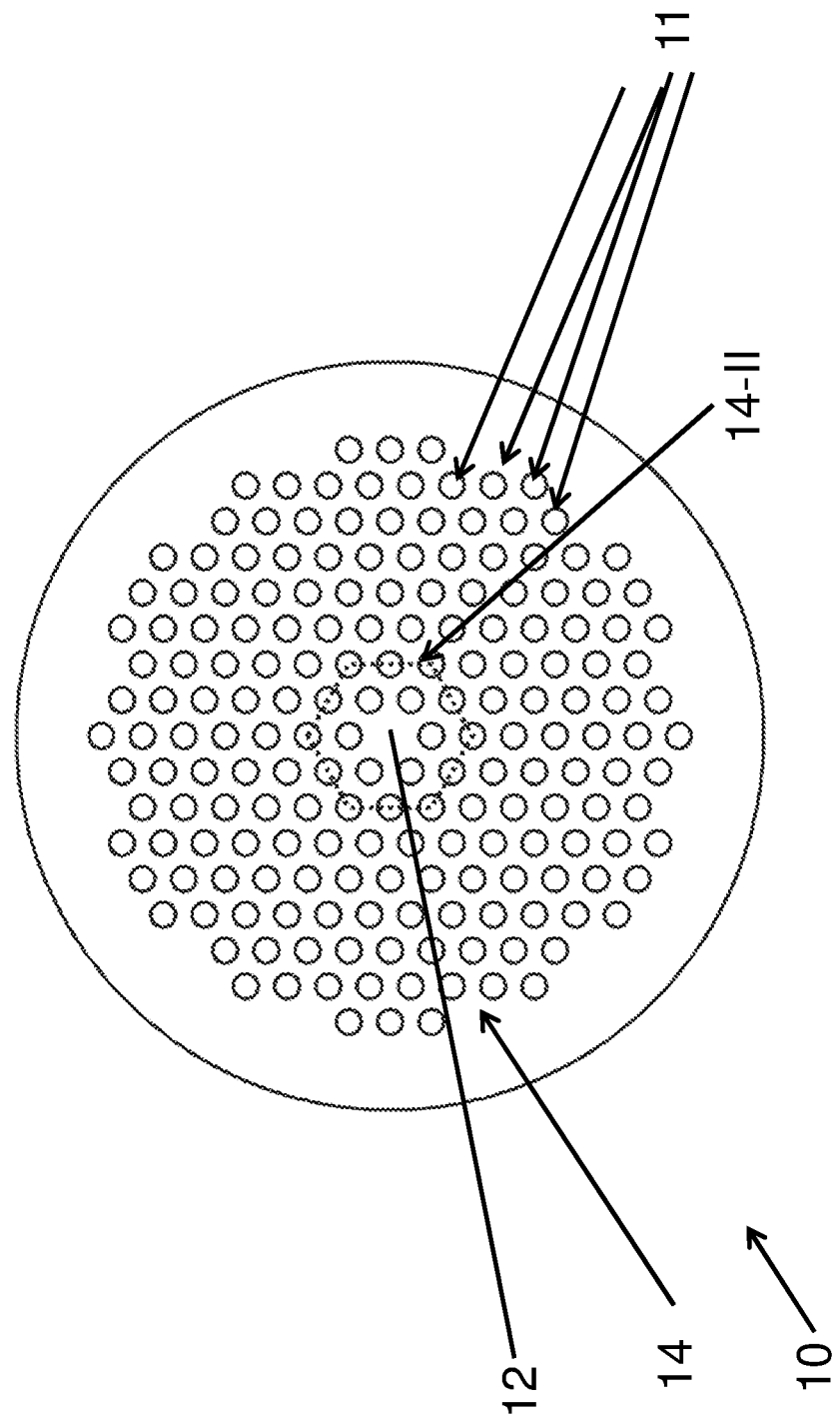

SOURCE OF SUPERCONTINUUM RADIATION AND MICROSTRUCTURED FIBER

CROSS REFERENCE TO RELATED APPLICATIONS

The present application is a continuation of U.S. application Ser. No. 16/913,640, filed on Jun. 26, 2020, which is a continuation of U.S. application Ser. No. 16/396,802, filed on Apr. 29, 2019, now U.S. Pat. No. 10,698,155, which is a continuation of U.S. application Ser. No. 15/128,697, filed on Sep. 23, 2016, now U.S. Pat. No. 10,274,672, which is a U.S. national stage of International Application No. PCT/DK2015/050066, filed on Mar. 25, 2015, which claims the benefit of Danish Application No. PA 2014 70146, filed on Mar. 25, 2014. The entire contents of each of U.S. application Ser. No. 16/913,640, U.S. application Ser. No. 16/396,802, U.S. application Ser. No. 15/128,697, International Application No. PCT/DK2015/050066, and Danish Application No. PA 2014 70146 are hereby incorporated herein by reference in their entirety.

TECHNICAL FIELD

The invention relates to a microstructured optical fiber and to a source of optical supercontinuum radiation.

BACKGROUND

Microstructured optical fibers are well known in the art and include fibers having a core surrounded by a cladding having a plurality of cladding features arranged in a background material, typically in a regular array. The features may be voids filled with air, gas or liquid, or they may be solid material having a lower refractive index than the background material. Microstructured optical fibers are also denoted "holey fibers" and "photonic crystal fibers". The cladding may for example be arranged to have an effective refractive index that is lower than the refractive index of the core and thus permits the guidance of light in the core by a variation of the traditional mechanism of total internal reflection.

The microstructured fiber may be made of silica glass. Other materials may be added to the silica glass in order to alter the refractive index thereof or to provide effects, such as amplification of light, sensitivity, etc.

The center-to-center spacing between the cladding features/holes is defined as the pitch ($\Lambda$). The microstructured fibers are characterized by the size of the core and the ratio of the size of the cladding features to their spacing or pitch ($\Lambda$). By tailoring the size and pitch of the cladding features, the zero dispersion wavelength (ZDW) of the fiber may be tailored. In microstructured optical fibers it is thus possible to shift the ZDW to shorter wavelengths than the ZDW of the background material, typically silica glass; hereby, the ZDW may be tailored to enable supercontinuum generation from optical pulses pumped by a pump laser of a predetermined wavelength.

When optical pulses propagate through a highly nonlinear fiber, their temporal as well as spectral evolution is affected by a multitude of nonlinear effects as well as by the dispersive properties of the fiber. For sufficiently intense pulses the pulse spectrum broadens to become a supercontinuum light.

WO2009/098519 describes an optical fiber arranged for providing supercontinuum generation down to wavelengths below 400 nm. Page 7, line 29 to page 8, line 1 describes that a microstructured optical fiber 20 of WO2009/098519 comprises a core substantially of 4.7 µm in diameter, a pitch $\Lambda$ of substantially 3.7 µm and that the ratio d/$\Lambda$ is substantially 0.77. Page 8, line 14-22 describes that the fiber 20 is a multimode fiber, and that the supercontinuum reaches wavelengths of up to 2550 nm. The pump wavelength is 1064 nm. As noted on page 8, line 14, the fiber 20 is multimode at the pump wavelength.

In the article "Very low zero-dispersion wavelength predicted for single-mode modified-total-internal-reflection crystal fibre" by Jacobsen et al, Journal of Optics A: Pure Appl. OPT 6 (2004) 604-607 it was found that for microstructured optical fibres with very small core, the zero dispersion wavelength could be below 700 nm while the fiber being single mode at the zero dispersion wavelength by arranging relatively large air holes close to the core and smaller air holes at a distance from the core.

SUMMARY

It is an object of the present invention to provide an optical fiber suitably for generating a stable single mode supercontinuum extending to blue wavelengths when pumped with a suitable pump laser, while at the same time having a high resistance against degradation due to the high peak power light required for generating supercontinuum.

In an embodiment of the present invention it is an object to provide a microstructured fiber arranged to provide a stable output, when light is launched into an input end of the fiber.

In an embodiment of the present invention it is an object to provide a source of supercontinuum radiation, where the optical spectrum from the source extends to blue wavelengths.

In an embodiment of the present invention it is an object to provide a microstructured optical fiber wherein the optical fiber has a relatively large core, but remains a single mode fiber.

In an embodiment of the present invention it is an object to provide a microstructured optical fiber which is able to guide light with a relatively broad bandwidth, e.g. more than about 100 nm, e.g. in a spectrum from about 400 nm to about 1700 nm.

In an embodiment of the present invention it is an object to provide a source of supercontinuum radiation, where the optical spectrum from the source is generated substantively exclusively in the fundamental mode of the fiber.

In an embodiment of the present invention it is an object to provide a supercontinuum light source that is suitable for use in endoscopy, surgical microscopy, confocal microscopy, optical coherence tomography (OTC), multi modal illumination, autofluorescence, fluorescence lifetime imaging measurements (FLIM), molecular imaging, optogenetics, displays, diffuse component characterization, solar cell characterization, quantum dot characterization, plasmonics, dispersive Fourier-Transformation spectroscopy and/or atomic trapping applications.

These and other objects have been solved by the invention or embodiments thereof as defined in the claims and as described herein below.

It has been found that the invention or embodiments thereof have a number of additional advantages which will be clear to the skilled person from the following description.

Unless otherwise specified, the term "substantially" should herein be taken to mean that ordinary product variances and tolerances are comprised.

All structural details of the optical fiber, such as core size, feature diameters bridge widths and similar are is given in relation to a cross-sectional view of the fiber unless otherwise specified. The microstructured optical fiber of the invention has a length and a longitudinal axis along its length and comprises a core region that is capable of guiding light along the longitudinal axis of the optical fiber. The microstructured optical fiber further comprises a cladding region which surrounds the core region. The cladding region comprises a cladding background material and a plurality of cladding features within the cladding background material. The cladding features are arranged around the core region.

In at least a double clad length section of the fiber, the cladding comprises an inner cladding region comprising at least one inner ring of inner cladding features and an outer cladding region comprising at least three outer cladding rings of outer cladding features. The inner cladding region is adjacent to the core region and the outer cladding region is adjacent to the inner cladding region. The inner cladding features have a first characteristic diameter ($d_1$). The outer cladding region comprises a plurality of outer cladding features having a characteristic diameter ($d_2$). The core region is substantially circular with a diameter of at least about 2 μm. In general a larger core will be more resistant than a smaller core against degradation due to the high peak power light required for generating supercontinuum. A core below 2 μm has been found to be unsuitably for supercontinuum generation in any practical applications.

By arranging the features in respectively the inner and the outer cladding regions with a new and improved geometry it has been found that the optical fiber will obtain a desirable combination of properties including, being single mode even where the core is relatively large and being suitable for providing an optical supercontinuum extending to blue wavelengths with a relatively stable output. Further it has surprisingly been found that the obtained fiber remain single mode even where the core is 2 μm in diameter or larger which thereby ensures that the optical fiber has a desirable high degradation stability against high peak power light and that the optical fiber therefore is highly suitable for use in a high power supercontinuum generation light source.

Each ring of cladding features comprises bridges of cladding background material separating adjacent features of the ring. In other words a "ring" is composed of alternating features and bridges. Each bridge has a minimum width determined as the shortest distance between two adjacent features of a ring.

The terms "inner ring" and "inner cladding ring" are herein used to denote a ring of features and bridges in the inner cladding region and the terms "outer ring" and "outer cladding ring" are herein used to denote a ring of features and bridges in the outer cladding region. The term "inner bridge" used to denote a bridge in an inner ring and the term "outer bridge" is used to denote bridge in an outer ring.

In the context of the present application, the phrase "ring of cladding features" refers to the cladding features typically having substantially equal distance to the core region. The innermost ring of cladding features consists of those cladding features being closest to the core region. The next ring of cladding features, counted from the core region, consists of those cladding features that are closest to the cladding features of the innermost ring, etc. Typically, a ring is not circular, but rather shaped according to the shape of the cladding features, such as in a hexagonal shape. In the context of the present application, the phrase "ring of cladding features" is meant to indicate a whole ring comprising all the features of a ring as explained above. Thus, in a ring of inner cladding features, all the cladding features within the ring are of substantially the same size.

In the context of the present application, the phrase "characteristic diameter" is a measure of the size of a cladding feature. If the cladding feature is circular, the characteristic diameter is the diameter of the circle of the cladding feature. In case the cladding feature is not circular, the characteristic diameter could either be the average of the maximum and the minimum extent of the cladding feature or the diameter of a circle having an area corresponding to a calculated or measured area of the cladding feature.

The outer cladding region comprises a plurality of outer cladding features having a characteristic diameter having an average diameter of $d_2$. In one embodiment substantially all of the outer cladding features have a characteristic diameter of about the average diameter $d_2$. However, the outer cladding region may comprise outer cladding features of differing characteristic diameters.

The bridges of the at least one inner ring having an average minimum width ($w_1$), and the bridges of at least one of the outer cladding rings having an average minimum width ($w_2$), where the average minimum with ($w_2$) of at the least one outer ring bridges is at least about 10% larger than the average minimum with ($w_1$) of the at least one inner ring bridges.

By providing the inner ring(s) with bridges that have a smaller width than the bridges of at least one outer ring it is believed that the dispersion properties and the confinement properties is at least partly decupled such that the inner cladding region is dominantly responsible for the dispersion properties and the outer cladding region is dominantly responsible for the confinement properties. Thereby it is now possibly to optimize dispersion properties and confinement properties, much more freely.

By selecting the relative bridge width of inner and outer rings the at least the first higher order mode for selected wavelength comprising wavelengths in the visible range can be stripped off. This is provided by constructing the inner and outer rings such that the higher order mode(s) is/are at least partly confined by the inner cladding region, but at the same time the outer cladding region is not confining the higher order mode(s) at the desired wavelengths.

Advantageously the bridges of the at least one inner ring having substantially equal minimum width ($w_1$), preferably the average minimum with ($w_2$) of the at least one outer ring bridges is at least about 20%, such as at least about 50% larger than the minimum width ($w_1$) of the at least one inner cladding ring bridges.

Preferably the average minimum with ($w_2$) of the at least three outer ring bridges is at least about 10%, such as at least about 20%, such as at least about 50% larger than the minimum width ($w_1$) of the at least one inner cladding ring bridges.

To ensure a high degree of higher order mode strip off it is generally desired that the average minimum with ($w_2$) of the at least three outer ring bridges is from about 15% to about 150% larger than minimum width ($w_1$) of the at least one inner cladding ring bridges.

The bridges of the outer rings can have equal or different minimum width, however in most situation it is desired that the outer cladding region has a homogeny distribution of the features such that the outer bridges has substantially equal minimum width.

In an embodiment the minimum with ($w_2$) of each of the at least three outer ring bridges are substantially equal, preferably the minimum with ($w_2$) of all of the at least three outer ring bridges are substantially equal.

The minimum width ($w_1$) of the at least one inner cladding ring bridges can in principle be as small as mechanically possibly. For example, a minimum width ($w_1$) of the at least one inner cladding ring bridges of about 0.3 μm is operable.

The smaller minimum width ($w_1$) the more will the fiber in principle approximate a strand of silica surrounded by an air layer and the outer cladding region, where the thickness of the air layer is the axially thickness of the inner cladding region. Unless otherwise specified the axially thickness of the inner cladding region is determined from the core region to a border r between the inner cladding region and the outer cladding region wherein the border is a line surrounding the inner cladding with a minimum distance to the inner cladding features equal to the minimum width ($w_1$) of the at least one inner cladding ring bridges.

Advantageously the minimum width ($w_1$) of the at least one inner cladding ring bridges is about 1.2 μm or less, such as about 1 μm or less, such as about 0.8 μm or less such as about 0.6 μm or less such as from about 0.4 to about 1.2 μm.

In an embodiment the minimum width ($w_1$) of the at least one inner cladding ring bridges is smaller than a Zero Dispersion Wavelength ZDW of the fundamental core mode. Where the core has two Zero Dispersion Wavelength (core ZDW's), it is preferred that the minimum width ($w_1$) of the at least one inner cladding ring bridges is smaller than the lowermost of the core ZDW's.

In an embodiment average minimum with ($w_2$) of the at least three outer ring bridges is larger than the Zero Dispersion Wavelength ZDW of the fundamental core mode.

The actual size of the average minimum with ($w_2$) may in principle be from about 10% larger than the minimum width ($w_1$) of the at least one inner cladding ring bridges up to where the cladding no longer confine the fundamental mode.

Advantageously the average minimum with ($w_2$) of the at least three outer ring bridges is larger than about 1 μm, such as at least about 1.2 μm, such as at least about 1.5 μm, such as at least about 2 μm.

The double clad length section of the optical fiber should advantageously have a length which is sufficient to couple at least a first higher order mode (LP11) out of the core.

The first higher order mode (LP11) should advantageously be coupled out of the core for at least a desired wavelength range comprising visible light, such as a wavelength range comprising at least about 100 nm, such as at least about 500 nm within the range from 400 nm to 1700 nm.

Preferably the double clad length section is at least about 10 cm, such as at least about 25 cm, such as at least about 50 cm.

Advantageously the double clad length section extends in substantially the entire length of the fiber.

The phrase "substantially the entire length of the fiber" is used to mean that a few mm of each end of the fiber may or may not be included. Very often—for example for avoiding contaminations in the features where the features are non-solids, such features are collapsed or "closed" with silica material.

In an embodiment a plurality of outer cladding features having a characteristic diameter smaller than the first characteristic diameter ($d_1$), wherein the first characteristic diameter ($d_1$) is at least about 10% larger than the average diameter ($d_2$) of the outer cladding features.

It should be noted, that the term "the first characteristic diameter ($d_1$) is at least 10% larger" has its normal mathematical meaning, viz. "$d_1 \geq 1.1 \cdot d_2$".

When the cladding of the microstructured fiber comprises an inner cladding region having inner cladding features and an outer cladding with outer cladding features, where the inner cladding features are larger than the average size of the outer cladding features, the microstructured optical fiber is suitable for providing a stable supercontinuum upon launching of an appropriate pump light into the microstructured fiber. It has been found that the relatively large inner cladding features assist in obtaining light at short wavelengths, e.g. down to 450 nm, 400 nm or even below 400 nm. The relatively small outer cladding features assist in making the microstructured fiber a single mode fiber. Moreover, it has turned out that upon launching an appropriate pump light into the microstructured fiber of the invention, the fiber is capable of providing supercontinuum radiation with an increased stability. Furthermore, when the microstructured fiber is used for supercontinuum generation by the launching of sufficiently powerful pump radiation into the fiber, the resultant spectrum of the supercontinuum radiation is more flat as a function of the wavelength compared to supercontinuum spectra obtained by a microstructured fiber having a cladding with cladding features of substantially identical sizes.

Selecting the first characteristic diameter ($d_1$) and the average diameter ($d_2$), wherein the first characteristic diameter ($d_1$) is at least 10% larger than the average diameter ($d_2$), provides an optical fiber wherein an effective refractive index of the inner cladding region is smaller than an effective refractive index of the outer cladding region. It should be noted, that in order to determine the effective refractive index of the inner cladding region, one method is to regard it as at least substantially identical to an effective refractive index of a cladding region wherein the structure of the inner cladding region is repeated infinitely.

When the outer cladding region comprises at least three outer cladding rings of outer cladding features, the leakage loss from the microstructured optical fiber is kept minimal.

When the core region has a diameter of at least about 2 μm it is as mentioned ensured that the optical fiber is able to withstand the powers necessary for supercontinuum generation and/or high power in general.

Where even higher degradation resistance is desired, the fiber may advantageously be loaded with hydrogen and/or deuterium e.g. as described in US 2011/0116283 or in U.S. Pat. No. 8,145,023 or as described in co-pending DK PA 2014 70800.

In an embodiment of the microstructured optical fiber according to the invention, an outer diameter of the outer cladding region and the average diameter ($d_2$) of the outer cladding features are dimensioned so as to allow the microstructured optical fiber to guide light at wavelengths above 2000 μm. Hereby, it is ensured that light at relatively high wavelengths is not leaking out of the fiber due to lack of confinement. Due to the confinement of light at relatively high wavelengths, such a fiber is well-suited for supercontinuum generation, wherein the spectrum also reaches low wavelengths, such as wavelengths below 500 nm, 450 nm, or even below 400 nm. This is at least in part due to group velocity match between high and low wavelengths of the supercontinuum spectrum. The first characteristic diameter is advantageously also dimensioned in order to assist in confinement of the light at relatively high wavelengths.

In an embodiment of the microstructured optical fiber according to the invention, the first characteristic diameter ($d_1$) is at least 15% larger than the average diameter ($d_2$) of the outer cladding features, such as at least 20% larger than the average diameter ($d_2$) of the outer cladding features, such as at least 25% larger than the average diameter ($d_2$) of the outer cladding features, such as at least 30% larger than the average diameter ($d_2$) of the outer cladding features, such as at least 35% larger than the average diameter ($d_2$) of the outer cladding features. When the inner cladding features are relatively larger than the outer cladding features, the microstructured fiber is a single mode at lower wavelengths. Moreover, the stability of an output end of the microstructured optical fiber is improved, when pump light is launched into an input end. Furthermore, when pump light is launched into an input end, the larger inner cladding features will assist in generating light at short wavelengths of the spectrum.

In an embodiment of the microstructured optical fiber according to the invention, the microstructured fiber is a non-linear fiber, a fiber for supercontinuum generation or a passive delivery fiber.

Advantageously—for simple production—the optical fiber is non-tapered.

In an embodiment of the microstructured optical fiber according to the invention, the core region is substantially circular and has a diameter between about 2 μm and about 6 μm, preferably between about 2.5 μm and about 5 μm, preferably between about 3 and about 4 μm. A microstructured optical fiber having such a core diameter is suitable for supercontinuum generation by launching pump light into an input end of the fiber.

In an embodiment of the microstructured optical fiber according to the invention, the core region of the microstructured fiber is substantially circular, and has a diameter larger than about 10 μm, preferably larger than about 12 μm, preferably larger than about 15 μm, preferably larger than about 20 μm, preferably larger than about 30 μm. A microstructured optical fiber having such a core diameter is a large mode area fiber that may be used as a delivery fiber arranged to move or guide the light without considerably changing its properties. Moreover, a microstructured fiber having a large mode area as indicated above is arranged for guiding light in a rather large bandwidth of more than 100 nm in single mode. For example, the microstructured optical fiber will be able to guide light in the wavelength range from about 400 nm to about 1700 nm. Moreover, the microstructured fiber with the above dimensions will be suitable for atomic trapping of light.

Advantageously the core region has a substantially identical diameter along substantially the entire length of the fiber.

In an embodiment of the microstructured optical fiber according to the invention, the core region comprises a core background material, wherein the core background material is doped with dopant material decreasing the refractive index of the core region compared to the undoped core background material. Examples of such dopant material comprise Fluor and Boron. When the core region comprises refractive index depressing elements, the microstructured optical fiber becomes a single mode fiber at lower wavelengths. The core background material may be substantially identical to the cladding background material, e.g. silica glass. However, according to this embodiment, the core region has a depressed refractive index compared to an undoped core background material.

In an embodiment the core region is microstructured for example such as described in DK PA 2014 00545.

In an embodiment of the microstructured optical fiber according to the invention, the inner cladding region comprises one, two or three inner rings of inner cladding features. This number of inner rings of cladding features is sufficient to obtain the effect that the generated supercontinuum spectrum will include short wavelengths, e.g. down to 450 nm, 400 nm or even below 400 nm, when appropriate pump light is launched into the fiber.

In an embodiment where there is more than one inner ring it is desirable that the minimum width of bridges of the inner rings are substantially identical.

Advantageously the inner cladding region comprises only one ring of inner cladding features. Where there is only one inner ring with relative narrow bridges such as with the minimum width ($w_1$) as described above, the inner cladding region add to the effect that the generated supercontinuum spectrum will include short wavelengths, e.g. down to 450 nm, 400 nm or even below 400 nm, when appropriate pump light is launched into the fiber, while at the same time the inner cladding region it too thin (determined in axial direction from the core to the outer cladding region) to confine the light in the core. The outer cladding region serve to confine the fundamental mode of the core, while simultaneously allow stripping off of higher order core modes.

In an embodiment the thickness of the inner cladding region determined in axial direction from the core to the outer cladding region advantageously is less than about 80% of the core diameter, such as about 70% of the core diameter or less, such as about 60% of the core diameter or less, such as about 50% of the core diameter or less. It has been found that the optical fiber with a relatively thin inner cladding region, such as a cladding region with a thickness of 80% of the core diameter or less or preferably with a thickness of 50% of the core diameter or less is highly suited for use in supercontinuum generation for obtaining blue single mode light extending below 400 nm. The narrow inner cladding region ensures an almost complete stripping off of at least the first higher order mode in the visible range of light.

In an embodiment of the microstructured optical fiber according to the invention, the inner cladding features of the inner cladding region are arranged at a first pitch ($\Lambda_1$) and the outer cladding features of the outer cladding region are arranged at a second pitch ($\Lambda_2$). The inner cladding features in the inner cladding region have a first relative cladding feature size ($d_1/\Lambda_1$) and the outer cladding features in the outer cladding region have a second relative cladding feature size ($d_2/\Lambda_2$), where the difference ($d_1/\Lambda_1 - d_2/\Lambda_2$) between the first relative cladding feature size and the second relative cladding feature size is larger than about 0.1, preferably larger than about 0.15, preferably larger than about 0.2, preferably larger than about 0.25, preferably larger than about 0.3. In the context of this application, the term "pitch ($\Lambda$)" is meant to denote the spacing between neighboring cladding features, e.g. the distance between the centers of two adjacent cladding features. The term 'relative cladding feature size ($d/\Lambda$)' is also referred to as the 'air filling ratio' in case the cladding features are air-filled voids. When the absolute numerical value of the difference between the first relative cladding feature size and the second relative cladding feature size is as indicated, an appropriate balance is reached between the effects obtained by the larger features in the inner cladding region and the smaller features in the outer cladding region. In order to obtain single-mode properties for the optical fiber it is advantageous that the difference ($d_1/\Lambda_1 - d_2/\Lambda_2$) between the first relative cladding feature size and the second relative cladding feature size is as big as possible, however if the difference is too big, light cannot be confined sufficiently within the optical fiber, and light is thereby lost. The above indicated values of the difference are values whereby an appropriate balance is reached.

In an embodiment of the microstructured optical fiber according to the invention, the difference between the first characteristic diameter ($d_1$) and the average diameter ($d_2$) of the outer cladding features is larger than about 0.3 µm, preferably larger than about 0.4 µm, preferably larger than about 0.5 µm, preferably larger than about 0.6 µm. Hereby, an appropriate balance is reached between the effects obtained by the larger features in the inner cladding region and the smaller features in the outer cladding region.

In an embodiment of the microstructured optical fiber according to the invention, the first characteristic diameter is larger than about 1.5 µm, such as larger than about 1.8 µm, such as larger than about 2.0 µm, such as larger than about 2.2 µm, such as larger than about 2.4 µm, such as larger than about 2.6 µm, such as larger than about 2.8 µm. A microstructured optical fiber having first cladding features with the indicated first characteristic diameter is a fiber, in which it is possible to generate a supercontinuum spectrum having very short wavelengths, such as less than 400 nm or less than 450 nm, in combination with the fact that the microstructured optical fiber is a single-mode fiber, at least at a very large part of the spectrum, e.g. from 800 nm and above.

In an embodiment of the microstructured optical fiber according to the invention, the average diameter ($d_2$) of the outer cladding features is between about 1.1 µm and 1.8 µm, such as between about 1.15 µm and about 1.7 µm, such as between about 1.2 µm and about 1.5 µm, such as about 1.3 µm. It should be noted, however, that the overall limitation that the first characteristic diameter is at least about 10% larger than the average diameter of the outer cladding features of course still holds. Therefore, not all of the combinations of the above indicated first characteristic diameter and the average diameter of the outer cladding feature are possible. A microstructured optical fiber having an average diameter of the outer cladding features as indicated above is well-suited for obtaining confinement of the light at a broad spectrum of wavelengths.

In an embodiment of the microstructured optical fiber according to the invention, the first pitch ($\Lambda_1$) and the second pitch ($\Lambda_2$) each are between about 2.5 µm and about 3.5 µm. These values of the first and second pitch result in a relatively small core region of 2 µm or larger, such as 3 µm or larger which in turn assists in obtaining a supercontinuum spectrum including very short wavelengths, e.g. below 450 nm, below 400 nm or even down to about 350 nm.

In an embodiment the features of the at least one inner ring of the inner cladding region are oval with a larger diameter and a perpendicular smaller diameter having an aspect ratio of from about 1:1.2 to about 1:3, preferably from about 1:1.5 to about 1:2.5, preferably the features of the at least one inner ring of the inner cladding region are orientated with their smaller diameter in radial direction relative to the longitudinal axis of the optical fiber. By arranging the features of the inner ring with their smaller diameter in radial direction relative to the longitudinal axis of the optical fiber, the resulting thickness of the inner cladding region is relatively low and preferably 80% or less, such as about 50% or less of the core diameter. At the same tile it is desired that there is only one inner ring.

In an embodiment the inner cladding region has a lower effective refractive index than the outer cladding region. In this embodiment the features of the inner cladding region advantageously has a characteristic diameter which is larger than the average diameter of the outer cladding features.

In an embodiment the inner cladding region has an effective refractive index which is equal to or higher than the effective refractive index outer cladding region. In this embodiment the features of the inner cladding region advantageously has a characteristic diameter which is smaller than the average diameter of the outer cladding features. Preferably the average diameter of the outer cladding features including the features of the at least 3 outer rings is at least about 10% larger, such as at least about 20% larger, such as at least about 50% larger than the characteristic diameter of the inner cladding features.

In an embodiment the characteristic diameter of the inner cladding features is about half or less than the average diameter of the outer cladding features including the features of the at least 3 outer rings.

Further in this or in another embodiment the features of the inner cladding region are arranged at a first pitch ($\Lambda_1$) and the features of the outer cladding region are arranged at a second pitch ($\Lambda_2$), wherein the second pitch are larger than the first pitch, such as at least about 10% larger, preferably at least about 25% larger, more preferably at least about 50% larger.

The second pitch ($\Lambda_2$) is advantageously at least about 2.5 µm to ensure a sufficient higher order mode stripping off.

Preferably the inner cladding region has a radial thickness which is about 80% or less relative to the core diameter, such as about 60% or less, relative to the core diameter.

In an embodiment the second pitch is at least about twice the first pitch.

In an embodiment of the microstructured optical fiber according to the invention, the cladding features of the inner and outer cladding regions are sized so that the highest effective refractive index of the cladding region is larger than the effective index of higher order core modes at about 1400 nm and above; preferably at about 1200 nm and above, preferably at about 1100 nm and above, preferably at about 1050 nm and above, preferably at about 1030 nm and above. When the highest effective refractive index of the cladding region is larger than the effective index of higher order core modes for a given wavelength range, such higher order core modes are not guided in the microstructured optical fiber at the given wavelength range. Hereby, it is obtained that the fiber is single-mode within the given wavelength range due to the fact that only the fundamental core mode is guided.

In an embodiment of the microstructured optical fiber according to the invention, the cladding features are air filled, gas filled or liquid filled voids, or glass having a lower refractive index than the base material, e.g., fluor-doped silica glass.

In an embodiment of the microstructured optical fiber according to the invention, the fiber has a transmission loss below 1 dB/m for the fundamental mode of light at wavelengths between about 400 nm and about 2300 nm when light is launched into the fiber. The number of outer cladding rings and the size of the outer cladding features are chosen in order to provide sufficient confinement of the fundamental mode of light to provide this low transmission loss.

In an embodiment of the microstructured optical fiber according to the invention, the core region of the microstructured fiber comprises a first refractive index, and the inner cladding region comprises a second refractive index such that the Δ-value between the core region and the maximum refractive index for the cladding region as a whole is smaller than about 0.03, such as smaller than about 0.025. The Δ-value provides a measure of the degree to which the optical fiber is a single mode fiber. A small Δ-value corresponds to the optical fiber being single mode to a large degree.

In numerical form, the Δ-value is given as: $\Delta=(n_c-n_{\mathit{eff},cl})/n_c$, where $n_c$ is the index of the core and $n_{\mathit{eff},cl}$ is the effective index of the cladding.

The refractive index of the core is given by the refractive index of the base material and is generally simple to measure. The effective index of the cladding is a calculated quantity. A skilled person would use the fundamental space filling method to calculate the effective index of the cladding. The Δ-value may be directly and unambiguously determined by the base material of the cladding and the core in combination with the core size, the diameter of the air holes in the cladding (d) and their spacing or pitch (Λ).

In an embodiment of the microstructured optical fiber according to the invention, the fiber is a single mode fiber for any wavelength above about 350 nm, such as for any wavelengths above about 500 nm, such as for any wavelength above about 600 nm, such as for any wavelength above about 700 nm, such as for any wavelength above about 800 nm, such as for any wavelength above about 900 nm, such as for any wavelength above about 1000 nm, such as for any wavelength above about 1100 nm, such as for any wavelength above about 1200 nm.

In an embodiment of the microstructured optical fiber according to the invention the outer cladding region comprises at least four outer cladding rings of outer cladding features, such as at least five outer cladding rings of outer cladding features, such as at least six outer cladding rings of outer cladding features, such as seven outer cladding rings of outer cladding features. An increased number of outer cladding rings of outer cladding features help confining light within the optical fiber by reducing leakage loss.

In an embodiment the outer cladding region has a higher effective refractive index than the effective index of at least the first higher order core modes at wavelengths spanning at least about 100 nm, such as at least about 500 nm in the wavelength range of from about 400 nm to about 2400 nm.

In an embodiment the cladding features has a refractive index which is lower than the refractive index of the cladding background material, preferably the cladding features are non-solid voids optionally filled with air or another gas or gas mixture.

To provide a desired supercontinuum generation spanning over at least from about 400 nm to about 1700 nm it is desired that the optical fiber has a zero dispersion wavelength of from about 860 nm to about 1400 nm. Preferably the optical fiber has a zero dispersion wavelength of from about 900 nm to about 1200 nm, and the fiber being single mode at least at the zero dispersion wavelength and preferably at least in the wavelength range from +200 nm to −200 nm relative to the zero dispersion wavelength, more preferably in the whole range from about 400 nm to about 1700 nm.

In an embodiment the invention relates to a cascade optical fiber comprising
  a. A first microstructured optical fiber according to the invention as described above,
  b. A second optical fiber comprising a second core region that is capable of guiding light along a longitudinal axis of the second optical fiber and a second cladding region surrounding the second core region.

In this embodiment, a mode field diameter of the first microstructured optical is larger than a mode field diameter of the second microstructured optical fiber. The first microstructured optical fiber is optically connected to the second optical fiber, preferably by splicing. The second optical fiber could also be a microstructured fiber according to the invention, viz. a fiber having cladding features of different sizes, or it could be a microstructured optical fiber having a cladding with cladding features which are all of substantially identical sizes.

Such a cascade optical fiber is advantageous for providing a combination of effects from the microstructured optical fiber according to the invention and the second optical fiber. In one embodiment, the first microstructured optical fiber is used as an input fiber such that it is ensured that the light output from the input fiber into the second optical fiber is single-mode light. In this case, even if the second optical fiber is a multi-mode fiber, the light output from the second optical fiber would be substantially single mode due to the fact that the light input into the second optical fiber from the first optical fiber was single-mode light.

The second optical fiber could be a robust passive. Alternatively, the second optical fiber could be a fiber arranged to stop dispersion. In this case the second optical fiber could advantageously be the fiber arranged for outputting light.

In the context of this application the term "mode field diameter" is meant to denote the diameter of the fundamental mode at which the optical field strength is reduced to 1/e of its maximum value. This corresponds to the diameter of the radial position where the light intensity falls to $e^{-2}$ of the peak light intensity, since the light intensity density is proportional to the square of the optical field strength.

The mode field diameter is determined by the numerical aperture and cut-off wavelength of the fiber and is related to the diameter of the fiber core. In general, the mode field diameter is of the same order of magnitude as the physical diameter of the fiber core.

In an embodiment the double clad length section of the first microstructured optical fiber extends in substantially the entire length of the fiber and the second optical fiber comprises at least a single clad length section, preferably the second optical fiber is a single cladding fiber in its entire length.

According to an embodiment, the invention relates to a second cascade optical fiber comprising a first and second fiber segment, wherein
  a. the first fiber segment comprises a single mode optical fiber, the single mode optical fiber comprising a third core region that is capable of guiding light along a longitudinal axis of the single mode optical fiber and a third cladding region comprising small cladding features, and
  b. the second fiber segment comprises a fourth core region that is capable of guiding light along a longitudinal axis of the second fiber segment and a fourth cladding region comprising large cladding features.

In this second cascade optical fiber, a mode field diameter of the first and second fiber segments are substantially identical, and the first and second fiber segments are optically connected, e.g. by being spliced together, in order for the light to be guided from the first fiber segment to and/or from the second fiber segment.

In this embodiment, the first fiber segment has a full cladding having cladding features of substantially equal size. Moreover, the second fiber segment has a full cladding having cladding features of substantially equal size. However, the size of the cladding features of the second fiber segment is larger than the size of the cladding features of the first fiber segment. The second fiber segment may advantageously be a so-called blue fiber arranged to create a supercontinuum spectrum extending to blue wavelengths (down to below 500 nm, 450 nm or even below 400 nm).

According to an embodiment, the invention relates to a source of optical supercontinuum generation. The source comprises a microstructured optical fiber according to the invention and a pump laser source adapted to generate pump radiation at a pump wavelength and to launch the pump radiation into the microstructured optical fiber at an input end thereof. The microstructured optical fiber is arranged to provide supercontinuum radiation upon launch of the pump radiation into the microstructured fiber.

Due to the hybrid cladding of the microstructured optical fiber according to the invention, this source of supercontinuum radiation is arranged to provide a more flat and more stable supercontinuum spectrum as compared to a source using a microstructured optical fiber having a cladding with cladding features of substantially equal size throughout a cross-section through the fiber perpendicular to the longitudinal direction thereof. The term "flat spectrum" is meant to denote that the power variation of the spectrum as a function of the wavelength is small. A stable spectrum is meant to denote that the spectrum does not fluctuate substantially and that the spectrum does not drift. Instead, the stable spectrum remains substantially unchanged as a function of time.

Preferably, the microstructured optical fiber used in the source of the invention is arranged to provide a supercontinuum spectrum extending to blue wavelengths of light, such as e.g. down to 450 nm, 400 nm or even below 400 nm.

According to an embodiment of the source according to the invention, the optical supercontinuum is generated substantially exclusively in the fundamental mode of the fiber.

Advantageously the microstructured optical fiber—at least at its input end and preferably along the major part of the fiber, such as along substantially its entire length—is single mode at the pump wavelength.

In an embodiment the microstructured optical fiber of the source of optical supercontinuum generation is a cascade optical fiber according to any of the claim 38 or 39 and the pump laser is arranged to launch the pump radiation into the first microstructured optical fiber at an input thereof.

In an embodiment of the source of optical supercontinuum generation according to the invention, the pump wavelength is between about 1000 nm and about 1100 nm, preferably between about 1030 nm and about 1070 nm, such as about 1030 nm or about 1064 nm. This is practical due to the fact that a variety of pump sources exist at these wavelengths.

In an embodiment the source of optical supercontinuum generation further comprises a spectral filtering unit, arranged to filter the output of the supercontinuum source to a filtered SC output having a central wavelength of $\lambda 1$ and an output bandwidth BW1, wherein at least one of the central wavelength of $\lambda 1$ and the output bandwidth BW1 is tunable. The output bandwidth BW1 is advantageously stepwise tunable with steps of less than about 5 nm. The spectral filtering unit e.g. comprises an AOTF.

In an embodiment, the invention relates to a use of a source of optical supercontinuum generation according to the invention for endoscopy and surgical microscopy applications.

In applications such as endoscopy and surgical microscopy there is a need for bright light and smooth true-color illumination to distinguish between certain types of tissue. Preferably this light should be guided through a thin optical waveguide for better wound healing after minimal invasive surgery.

In the context of the present invention, the phrase "supercontinuum" refers to a spectrally broad signal. The supercontinuum is to have a "blue edge" defining the lower boundary of the spectrum and a "red edge" defining the upper boundary of the spectrum. In a silica optical fiber, the blue edge may be at a wavelength in the range of 300 nm to 600 nm, such as in the range of 350 nm to 550 nm and the red edge may be at a wavelength in the range of 1300 nm to 2400 nm, such as in the range of 1600 nm to 2400 nm. The spectral width of the supercontinuum may be defined as the difference between the wavelength of the red and blue-edges. The spectral width may be more than 100 nm, such as more than 150 nm, such as more than 300 nm, such as more than 500 nm, such as more than 750 nm, such as more than 1000 nm, such as more than 1500 nm, such as more than 2000 nm, such as more than 2500 nm, such as more than 3000 nm.

In a microstructured optical fiber, the core region may be defined as the region immediately surrounded by cladding features. The core may be seen as a defect in the structure of cladding features, such as a missing cladding feature.

The invention also concerns a method of illuminating suitably for use in performing of a procedure selected from endoscopy, surgical microscopy, confocal microscopy, optical coherence tomography (OTC), multi modal illumination, autofluorescence fluorescence lifetime imaging measurements (FLIM), molecular imaging, optogenetics, displays, diffuse component characterization, solar cell characterization, quantum dot characterization, plasmonics, dispersive Fourier-Transformation spectroscopy and/or atomic trapping applications.

The method comprising providing a source of optical supercontinuum generation as described above, launching the pump radiation into the microstructured optical fiber at its input end, generating a supercontinuum within the microstructured optical fiber and emitting at least a fraction of the supercontinuum towards a target to be subjected to the procedure.

Due to the high stability of the source of optical supercontinuum generation of the invention, the source of optical supercontinuum generation has been found to be highly suitable for use in illumination procedures where several wavelengths are to be used simultaneously or in a switching order e.g. alternating. Preferred use of the optical supercontinuum generation according includes use for illuminating and sensor purposes in procedures comprising endoscopy, surgical microscopy, confocal microscopy, optical coherence tomography (OTC), multi modal illumination, autofluorescence, fluorescence lifetime imaging measurements (FLIM), molecular imaging, optogenetics, displays, diffuse component characterization, solar cell characterization, quantum dot characterization, plasmonics, dispersive Fourier-Transformation spectroscopy and/or atomic trapping applications.

In an embodiment the source of optical supercontinuum generation of the invention is advantageously used for monitoring one or more parameters of the eye of a patient over one or more sessions comprising for example one or more of the monitoring procedures described in US 2014/0232988.

In an embodiment the source of optical supercontinuum generation of the invention is advantageously used for scanning an eye e.g. as described in US 2014/0333978 or in US 2014/0288417.

The invention also concerns an illumination source suitably for use in at least one of endoscopy, surgical microscopy, confocal microscopy, optical coherence tomography (OTC), multi modal illumination, autofluorescence, fluorescence lifetime imaging measurements (FLIM), total internal reflection fluorescence (TIRF) microscopy; fluorescence resonance energy transfer (FRET), broadband spectroscopy, nanophotonics, flow cytometry, industrial inspection, ringdown spectroscopy, analytical spectroscopy, molecular imaging, optogenetics, displays, diffuse component characterization, solar cell characterization, quantum dot characterization, plasmonics, dispersive Fourier-Transformation spectroscopy and/or atomic trapping applications, wherein the illumination source comprising a source of optical supercontinuum generation as described above.

The illumination source of the invention advantageously comprises one or more optical filters arranged to filter a supercontinuum beam generated from the source of optical supercontinuum generation. The optical filter or filters is/are preferably tunable for tuning the output of the illumination source to one or more wavelengths and/or ranges of wavelengths. In an embodiment the output of the illumination source comprises two distinguished wavelengths or wavelength range(s) e.g. a first wavelength (such as a single wavelength or optionally a range of wavelengths) for generating a grid pattern or a monitoring/sensing of a parameter and a second wavelength range for generating illumination for a surgery.

In an embodiment the illumination source comprises a dispersive pulse stretching element for temporal stretching of light pulses e.g. as described in US 2014/0066723. The dispersive pulse stretching element preferably is or forms part of an optical fiber such as the delivery fiber. In an embodiment the dispersive pulse stretching element is incorporated into the source of supercontinuum generation.

Advantageously the source of optical supercontinuum generation comprises a fiber output end for generated supercontinuum light. The fiber output end is optically connected to a delivery fiber for delivering generated supercontinuum light to a position of illuminating. The delivery fiber is advantageously coupled to the fiber output end of the source of optical supercontinuum generation using a detachable connector, such that the delivery fiber may be changed if desired. The delivery fiber is preferably optically coupled to a probe and/or sensor e.g. by being at least partly incorporated into a probe and/or sensor.

In an embodiment the illumination source form part of a microscope, such as a surgical microscope, an optical fluorescence microscope, such as an optical fluorescence microscope based on fluorescence life time imaging (FLIM), a total Internal Reflection Fluorescence (TIRF) Microscopy.

Advantageously the illumination source is configured for use in eye illumination procedure such as eye surgery e.g. as described in US 2014/0066723. The delivery fiber is optically coupled to a probe advantageously by being at least partly incorporated into the probe for illumination onto or inside an eye prior to and/or during surgery. Preferably the probe has an outer diameter of up to about 125 µm. In an embodiment the illumination source is configured for use in OTC of an eye e.g. as described in US 2014/0293225 or US 2015/0080718.

In an embodiment the probe comprises a multi-spot generator such as described in US 2014/0200566 or US 2014/0180264 optically coupled to receive at least a part of an output beam from the delivery fiber. In an embodiment the multi-spot generator comprises a multi core optical fiber.

In an embodiment the probe comprises a diffractive optic element for generating a light pattern e.g. as described in U.S. Pat. No. 8,496,331.

Advantageously the source of optical supercontinuum generation of the illumination source is configured to generate a supercontinuum comprising wavelengths of less than 450 nm.

In an embodiment the illumination source is adapted for stimulated emission depletion.

The invention also comprises an industrial inspection apparatus e.g. for metrology, which apparatus comprises the illumination source as described above.

The invention also comprises a spectroscope comprising the illumination source as described above. Preferably the spectroscope is a ringdown spectroscopy (e.g. for use in gas sensing), an analytical spectroscope (e.g. for use in hyperspectral spectroscopy or crop analysis e.g. of fruits), a time of flight spectroscope and/or a dispersive Fourier-Transformation spectroscopy.

All features of the inventions and embodiments of the invention as described above including ranges and preferred ranges can be combined in various ways within the scope of the invention, unless there are specific reasons not to combine such features.

BRIEF DESCRIPTION OF DRAWINGS

The invention will be explained more fully below in connection with a preferred embodiment and with reference to the drawings in which:

FIG. 1b is a schematic representation of the cross-section of the fiber shown in FIG. 1a;

FIGS. 1c to 1e are schematic representations of the cross-sections of the microstructured fiber of FIG. 1a, with the first, second and third ring of cladding features indicated, respectively;

FIG. 2b is a schematic representation of the cross-section of the microstructured fiber shown in FIG. 2a;

FIG. 3b is a schematic representation of the cross-section of the microstructured fiber shown in FIG. 2a;

The figures are schematic and may be simplified for clarity. Throughout, the same reference numerals are used for identical or corresponding parts.

DETAILED DESCRIPTION

Figure 1A:
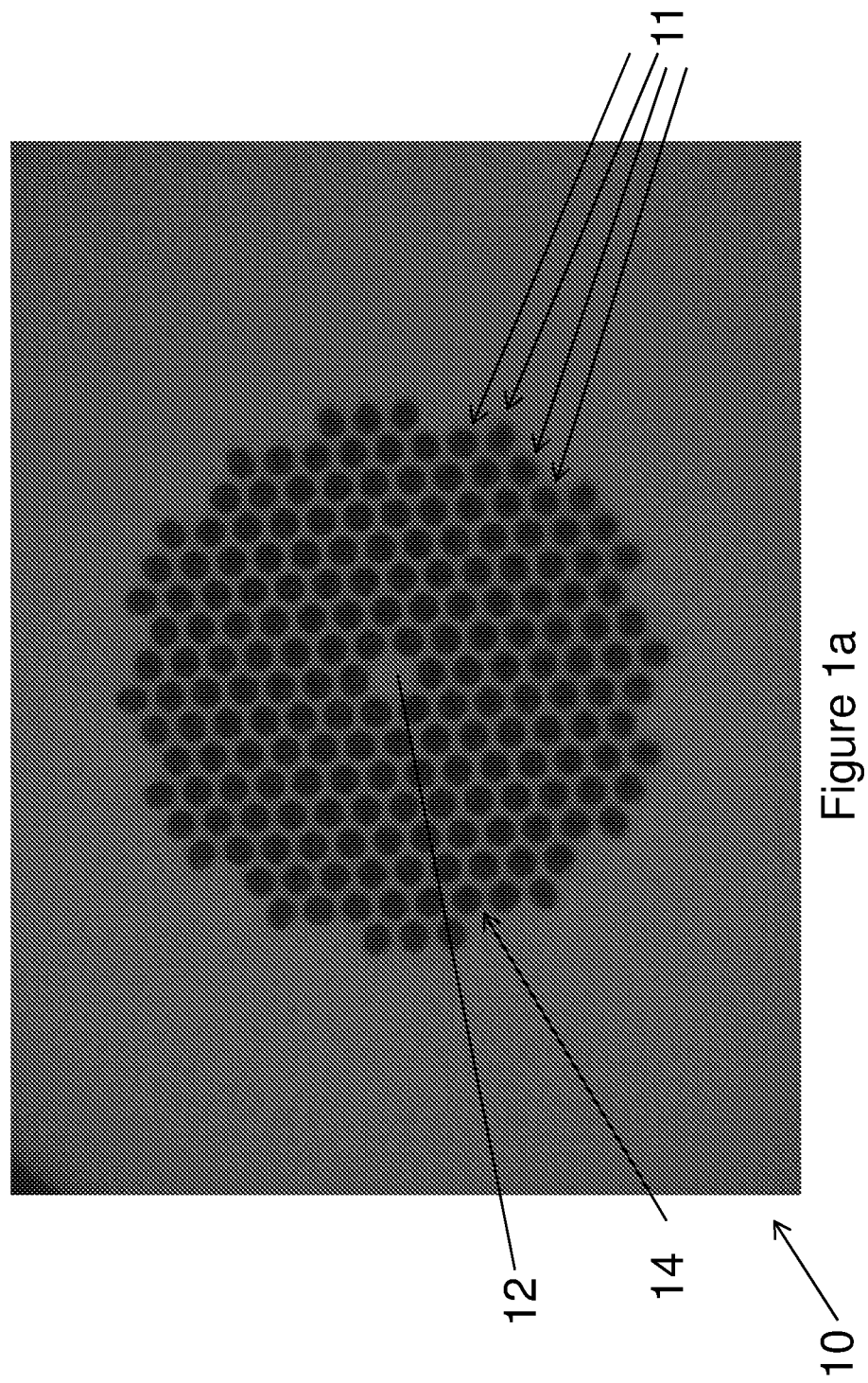
FIG. 1a is a micrograph image of a cross-section of a known microstructured fiber.

FIG. 1a is a micrograph image of a cross-section 10 of a known microstructured fiber, perpendicular to a longitudinal axis of the fiber. The fiber is a microstructured fiber comprising a core region 12 and a cladding region 14, the cladding region surrounding the core region 12. The core area or core region 12 is seen as the area inscribed by the cladding features 11 arranged to immediately surround the core 12.

The cladding region 14 comprises cladding features 11, here the features are in the form of substantially circular holes or voids extending in the longitudinal direction of the fiber, distributed within a cladding background or base material. The cladding features 11 are shown as arranged in a regular array. The microstructured optical fiber 10 shown in FIGS. 1a-1e has a single cladding comprising cladding features, each having substantially the same size.

FIG. 1b is a schematic representation of the cross-section of the fiber shown in FIG. 1a. FIG. 1b also shows that the cross-section 10 of the known microstructured fiber comprises a core region 12 surrounded by a cladding 14 having cladding features 11 in a regular array.

Figure 1C:
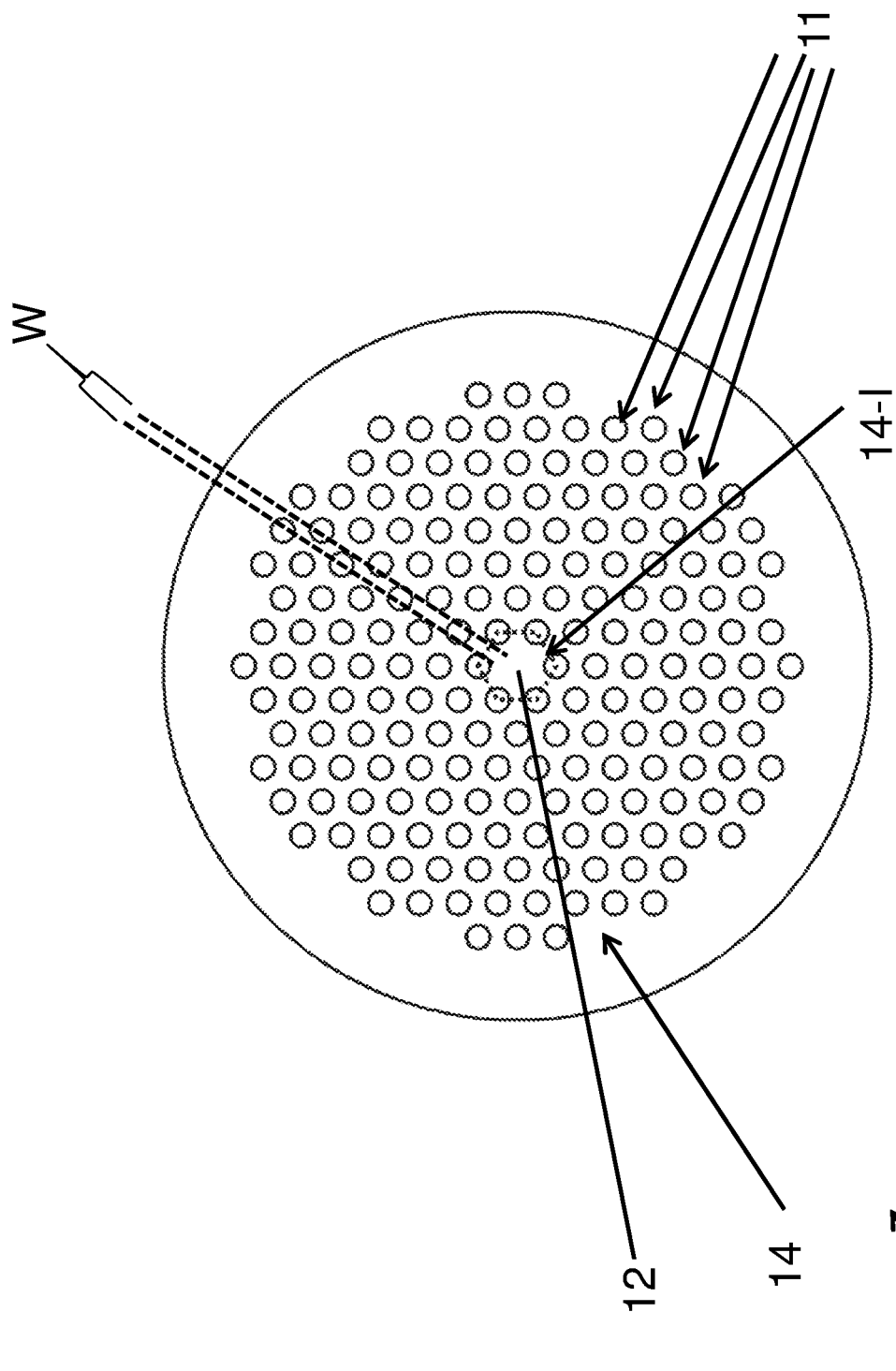
Figure 1E:
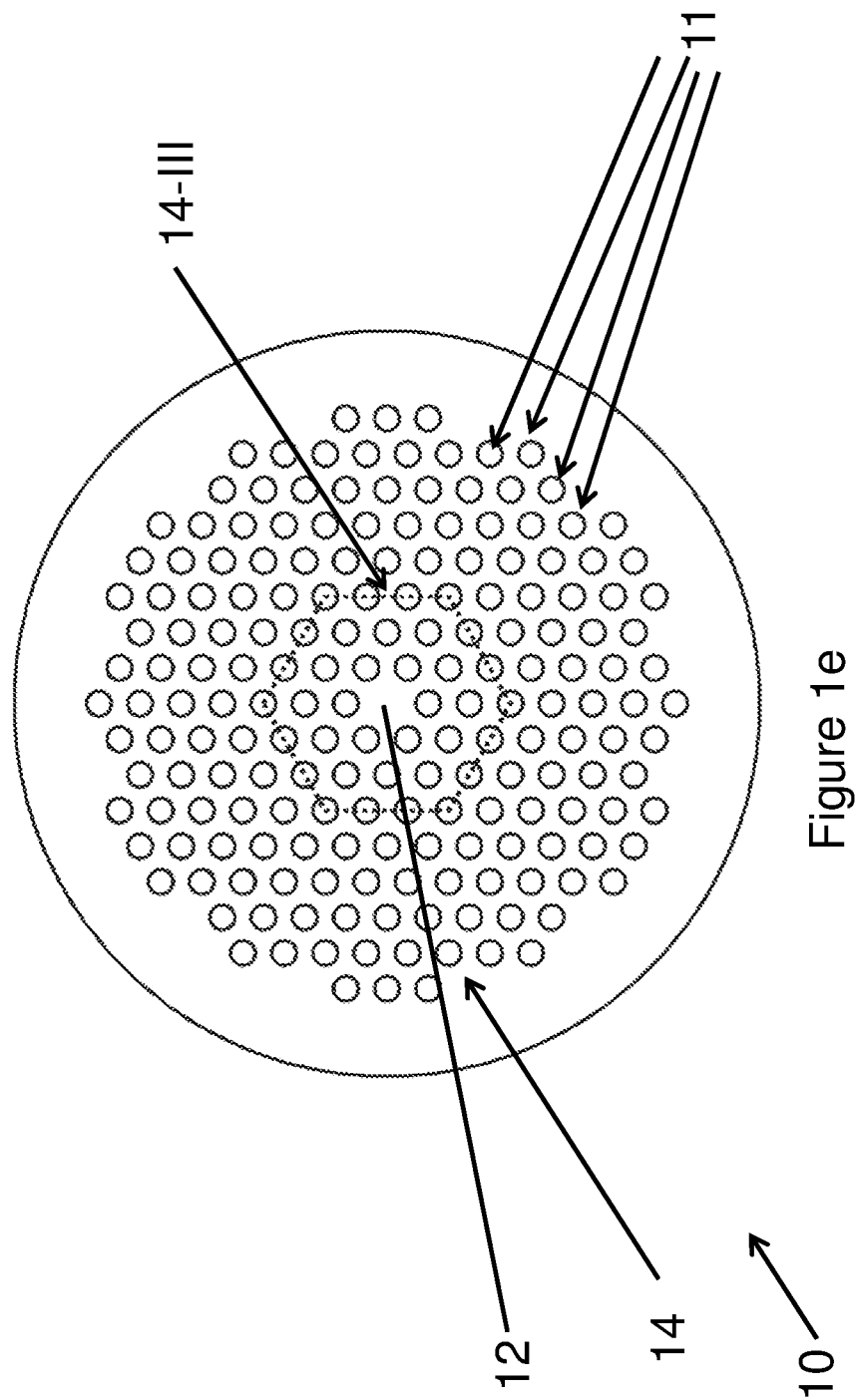

FIGS. 1c to 1e are schematic representations of the cross-sections of the microstructured fiber of FIG. 1a, with the first, second and third ring of cladding features indicated, respectively. In FIG. 1c, the dotted hexagon 14-I represents the innermost ring of cladding features with the between features arranged bridges indicated with "W". In this innermost or first ring of cladding features are six cladding features. In FIG. 1d, the dotted hexagon 14-II represents the next or second ring of cladding features. This next or second ring of cladding features contains twelve cladding features. In FIG. 1e, the dotted hexagon 14-III represents the next or third ring of cladding features. This third ring of cladding features contains eighteen cladding features.

FIG. 1c shows that the first or innermost ring 14-I of cladding features consists of those cladding features being closest to the core region. The next or second ring 14-II of cladding features, counted from the core region, consists of those cladding features that are closest to the cladding features of the innermost ring 14-I, etc. Typically, a ring is not circular, but rather shaped according to the shape of the cladding features, such as in a hexagonal shape. The cross-section of the microstructured fiber 10 shown in FIGS. 1a-1e has seven whole rings of cladding features as well as three times six additional cladding features adjacent to the seventh ring of cladding features.

In the context of the present application, the phrase "ring of cladding features" refers to the cladding features typically having substantially equal distance to the core region.

Figure 2A:
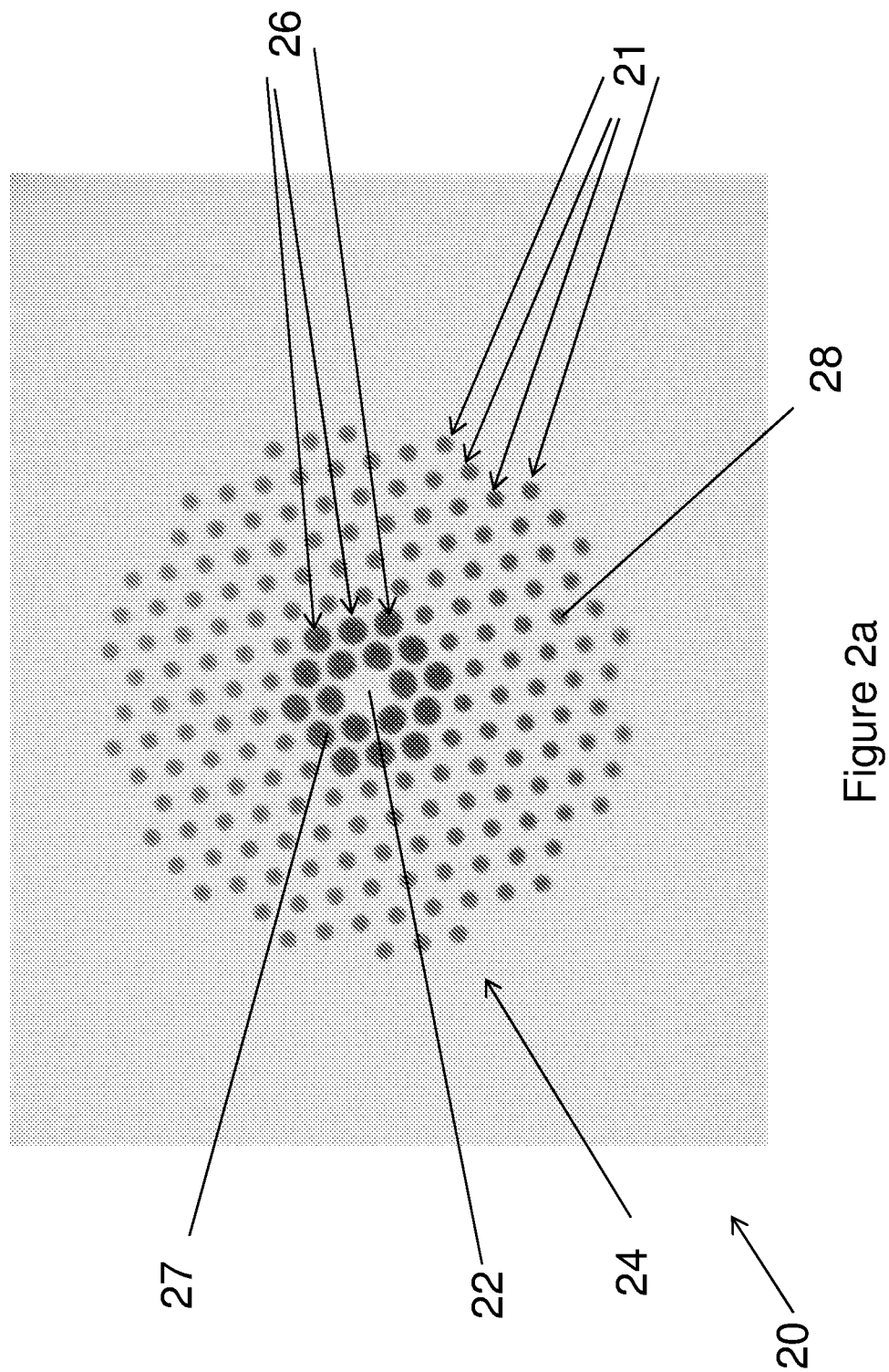
FIG. 2a is a micrograph image of a cross-section of an embodiment of a microstructured optical fiber according to the invention.
Figure 2B:
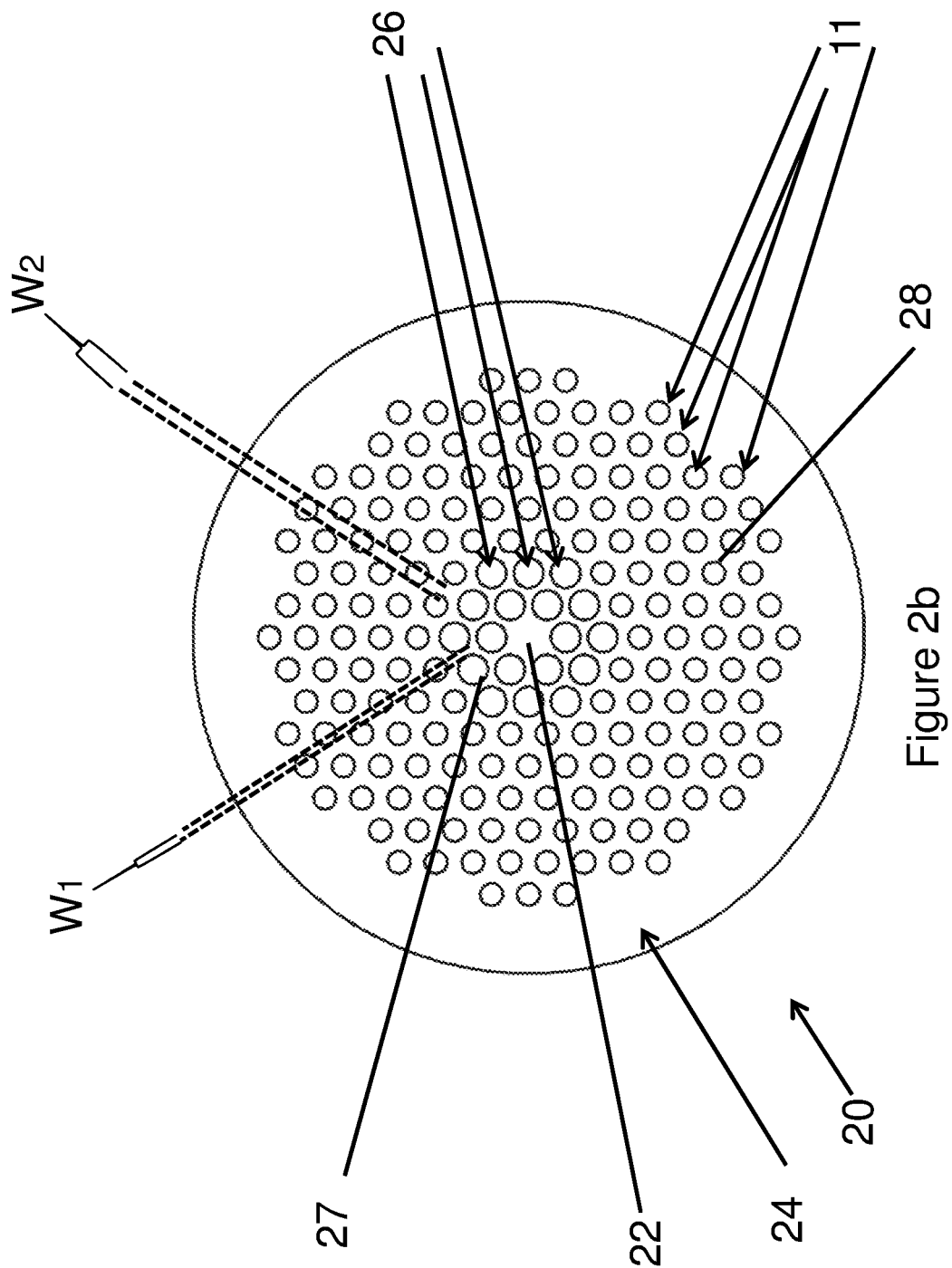

FIG. 2a is a micrograph image of a cross-section of an embodiment of a microstructured optical fiber 20 according to the invention, and FIG. 2b is a schematic representation of the cross-section of the microstructured fiber 20 shown in FIG. 2a.

In FIGS. 2a and 2b it may be seen that the fiber 20 comprises a core region or core 22 and a cladding region 24 surrounding the core region. It is moreover clear from FIGS. 2a and 2b that the cladding region 24 comprises a cladding background material and a plurality of cladding features 21, 26 within the cladding background material.

The cladding region comprises an inner cladding region 27 with two inner rings of inner cladding features 26 and an outer cladding region 28 comprising five whole outer cladding rings of outer cladding features 21 plus additional outer cladding features not constituting a ring adjacent to the outermost ring of outer cladding features. The bridges of background material between the features 26 of the inner cladding region 27 have a width $w_1$ and the bridges of background material between the features 21 of the outer cladding region 28 have a width $w_2$. It can be seen that $w_2$ is much larger than $w_1$ advantageously as described above.

It can be seen that the inner cladding region 27 is adjacent to the core region 22 and the outer cladding region 28 is adjacent to the inner cladding region. The inner cladding features have a first characteristic diameter ($d_1$) and the outer cladding region 28 comprises a plurality of outer cladding features 21 having a characteristic diameter smaller than the first characteristic diameter ($d_1$). The first characteristic diameter ($d_1$) is at least about 10% larger than an average diameter ($d_2$) of the outer cladding features 21.

It should be noted that only a few of the cladding features 21, 26 have been marked with reference numerals in the FIGS. 2a and 2b, that all 18 features of the two innermost rings are inner cladding features within the inner cladding region, and that the remaining cladding features shown in FIGS. 2a and 2b are outer cladding features.

Figure 3A:
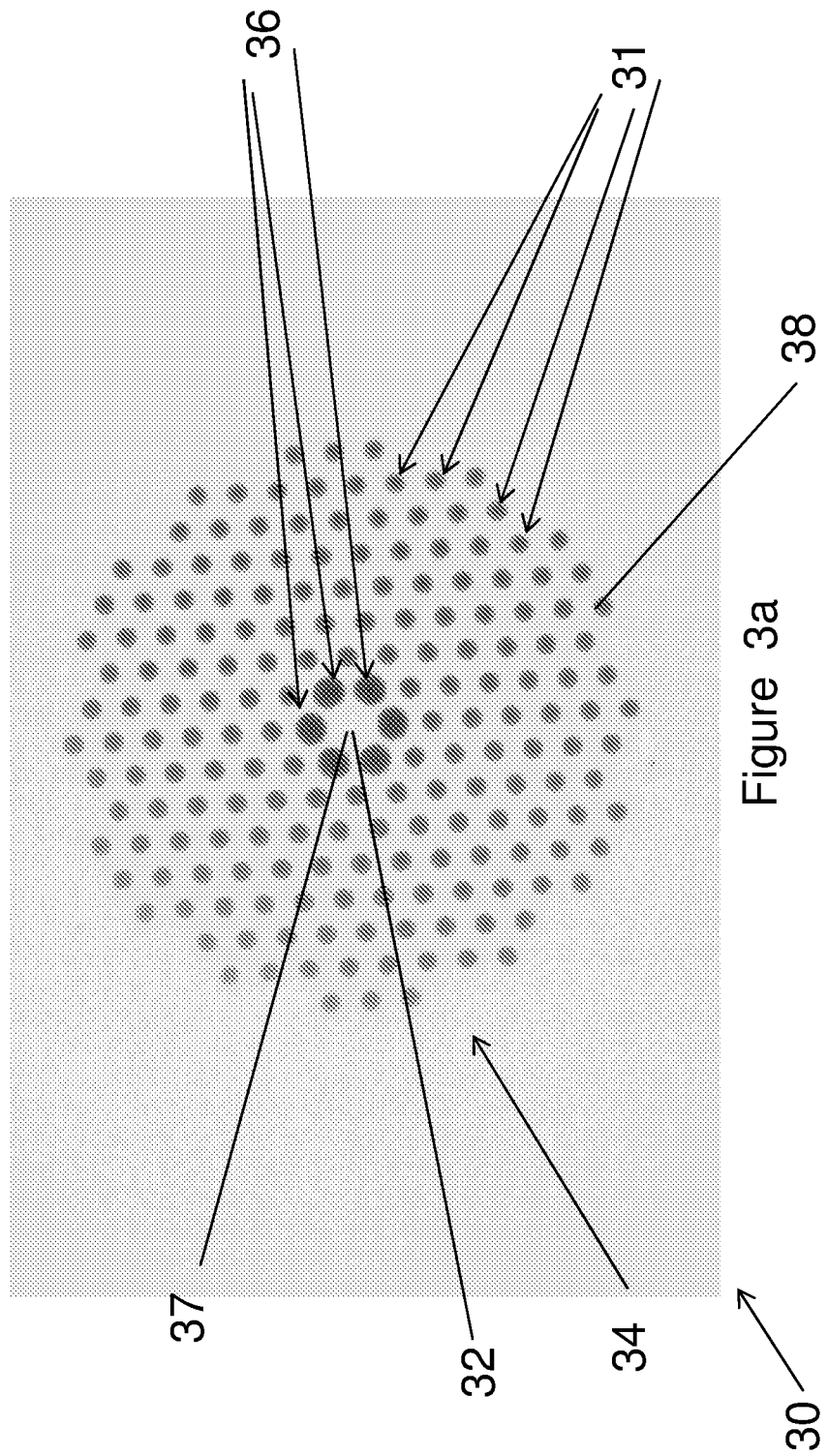
FIG. 3a shows a micrograph image a cross-section of an embodiment of a microstructured optical fiber according to the invention.
Figure 3B:
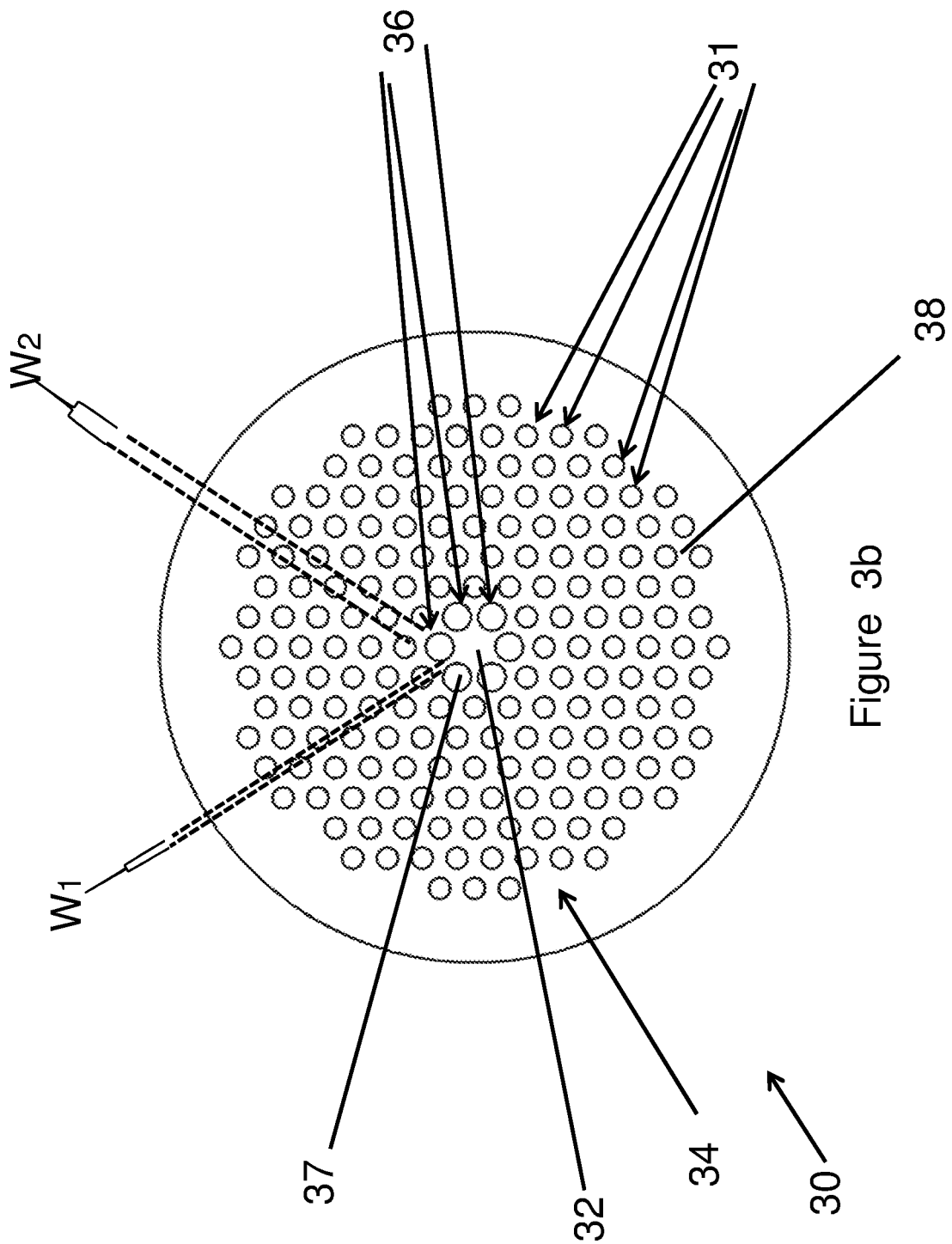

FIG. 3a is a micrograph image of a cross-section of an embodiment of a microstructured optical fiber 30 according to the invention, and FIG. 3b is a schematic representation of the cross-section of the microstructured fiber 30 shown in FIG. 3a.

In FIGS. 3a and 3b it can be seen that the fiber 30 comprises a core region or core 32 and a cladding region 34 surrounding the core region. It is moreover clear from FIGS. 3a and 3b, that the cladding region 34 comprises a cladding background material and a plurality of cladding features 31, 36 within the cladding background material.

The cladding region comprises an inner cladding region 37 with a single inner ring of inner cladding features 36 and an outer cladding region 38 comprising six whole outer cladding rings of outer cladding features 31 plus additional outer cladding features not constituting ring adjacent to the outermost ring of outer cladding features.

The bridges of background material between the features 36 of the inner cladding region 37 have a width $w_1$ and the bridges of background material between the features 31 of the outer cladding region 38 have a width $w_2$. It can be seen that $w_2$ is much larger than $w_1$ advantageously as described above.

It can be seen that the inner cladding region 37 is adjacent to the core region 32 and the outer cladding region 38 is adjacent to the inner cladding region 37. The inner cladding features 36 have a first characteristic diameter ($d_1$) and the outer cladding region 38 comprises a plurality of outer cladding features 31 having a characteristic diameter smaller than the first characteristic diameter ($d_1$). The first characteristic diameter ($d_1$) is at least about 10% larger than an average diameter ($d_2$) of the outer cladding features 31.

It should be noted that only a few of the cladding features 31, 36 have been marked with reference numerals in the FIGS. 3a and 3b, that all six features of the innermost ring are inner cladding features within the inner cladding region, and that the remaining cladding features shown in FIGS. 3a and 3b are outer cladding features.

Figure 3C:
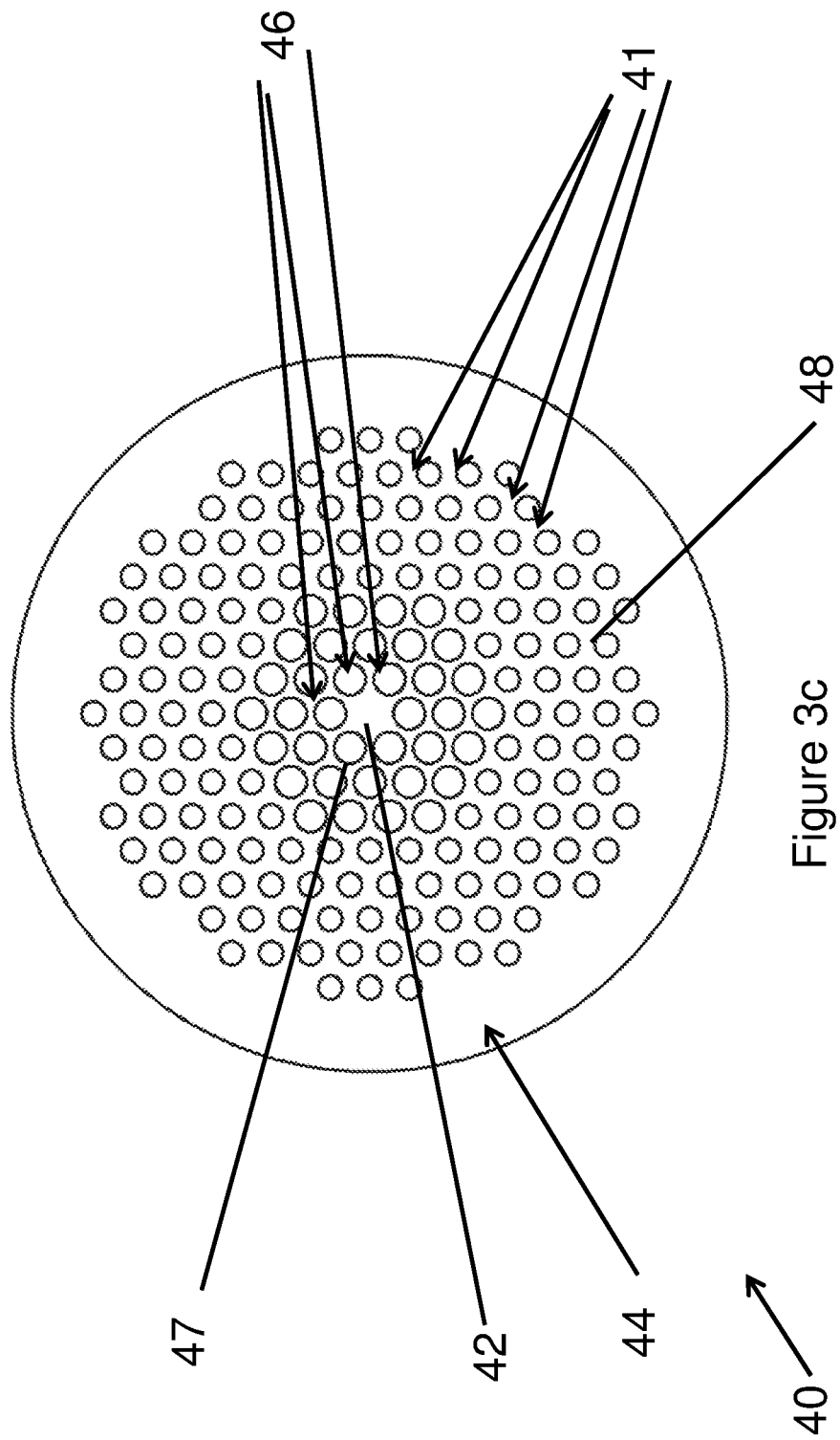
FIG. 3c is a schematic representation of a cross-section of an embodiment of a microstructured fiber.

FIG. 3c is a schematic representation of a cross-section of an embodiment of a microstructured fiber 40. In FIG. 3c it may be seen that the fiber 40 comprises a core region or core 42 and a cladding region 44 surrounding the core region. It is moreover clear from FIG. 3c, that the cladding region 44 comprises a cladding background material and a plurality of cladding features 41, 46 within the cladding background material.

The cladding region comprises an inner cladding region 47 with three inner rings of inner cladding features 46 and an outer cladding region 48 comprising five whole outer cladding rings of outer cladding features 41 plus additional outer cladding features not constituting a ring adjacent to the outermost ring of outer cladding features.

It can be seen that the inner cladding region 47 is adjacent to the core region 42 and the outer cladding region 48 is adjacent to the inner cladding region. The inner cladding features have a first characteristic diameter ($d_1$) and the outer cladding region 48 comprises a plurality of outer cladding features 41 having a characteristic diameter smaller than the first characteristic diameter ($d_1$). The first characteristic diameter ($d_1$) is at least about 10% larger than an average diameter ($d_2$) of the outer cladding features 41.

It should be noted that only a few of the cladding features 41, 46 have been marked with reference numerals in the FIG. 3c, that all 36 features of the three innermost rings are inner cladding features within the inner cladding region 47, and that the remaining cladding features shown in FIG. 3c are outer cladding features.

Figure 4:
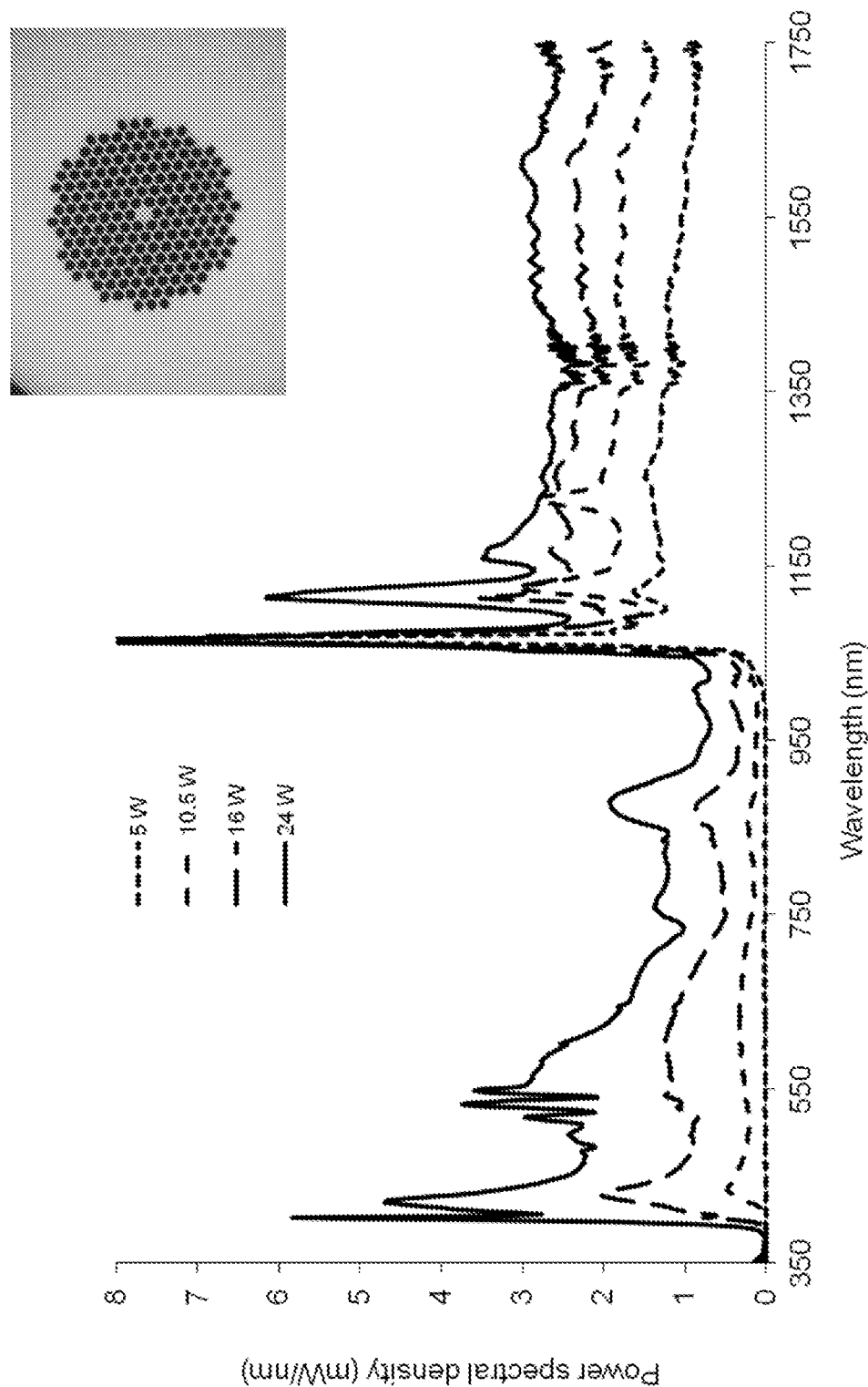
FIG. 4 shows graphs of power spectral density for a supercontinuum spectrum obtained by launching pump light at a pump wavelength into a standard microstructured optical fiber having a cladding with equally sized cladding features at different power levels.

FIG. 4 shows four graphs of power spectral density for a supercontinuum spectrum obtained by launching pump light at a pump wavelength into a standard microstructured optical fiber having a cladding with equally sized cladding features, for example a fiber 10 as shown in FIGS. 1a and 1b. The inset in the upper right corner of FIG. 4 shows a cross-section of the fiber used for generating the graphs of FIG. 4. The graphs of FIG. 4 show that an increased pump power results in an increased power spectral density of the generated supercontinuum. The pump power values shown in FIG. 4 relate to an estimated pump effect from the pump light source, the pump effect being the actual pump effect from the light source without any combiner loss.

Figure 5:
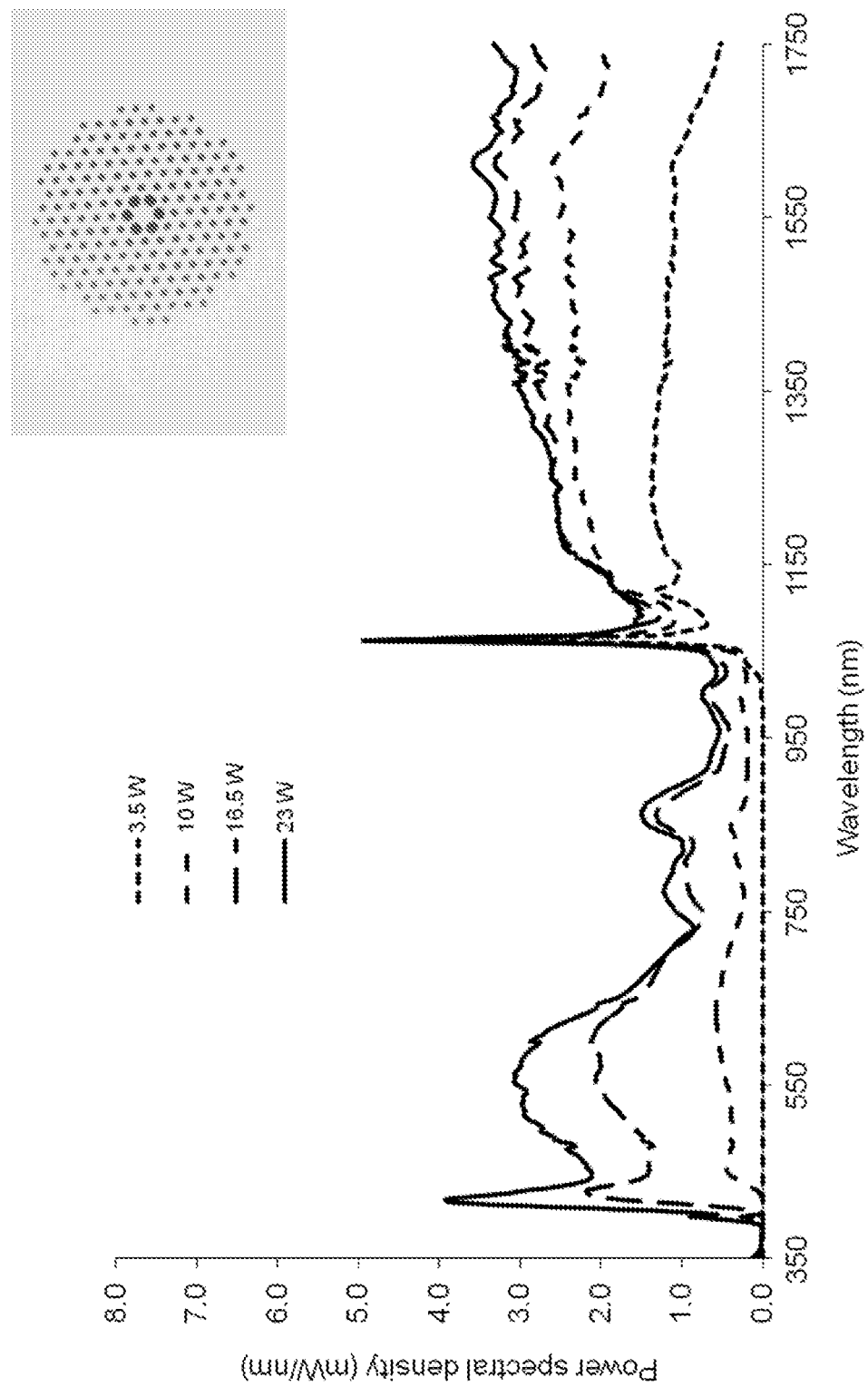
FIG. 5 shows graphs of power spectral density for a supercontinuum spectrum obtained by launching pump light at a pump wavelength into a microstructured optical fiber according to the invention at different power levels.

FIG. 5 shows graphs of power spectral density for a supercontinuum spectrum obtained by launching pump light at a pump wavelength of 1064 nm into a microstructured optical fiber 30 according to the invention at four different power levels. The inset in the upper right corner of FIG. 5 shows a cross-section of the fiber used for generating the graphs of FIG. 5, viz. the microstructured optical fiber 30. From FIG. 5 it is clear that an increased pump power results in increased power spectral density of the generated supercontinuum, and that for all four pump power levels the supercontinuum extends up to 1750 nm. However, this upper limit is a measurement limitation of the Optical Spectrum Analyser (OSA) used for the measurements, and the spectra all extend to wavelengths above 1750 nm. For the higher pump powers shown, the spectra extend to wavelengths well above 2000 nm. Moreover, for all pump powers but the lowest one, viz. 3.5 W, the spectrum extends to wavelengths below 400 nm; this is in particular clear for the pump powers 16.5 W and 23 W.

It should be noted that the pump power levels in FIGS. 4 and 5 are not identical, however they are comparable. When comparing the output power spectral densities shown in FIGS. 4 and 5, it is clear that they are of comparable magnitudes for comparable pump powers. Moreover, it is clear that the power spectral density is more stable for the optical fiber 30 according to the invention than for the standard fiber, in particular within the wavelength range between about 400 nm and about 750 nm and in particular for the higher pump powers.

Figure 6A:
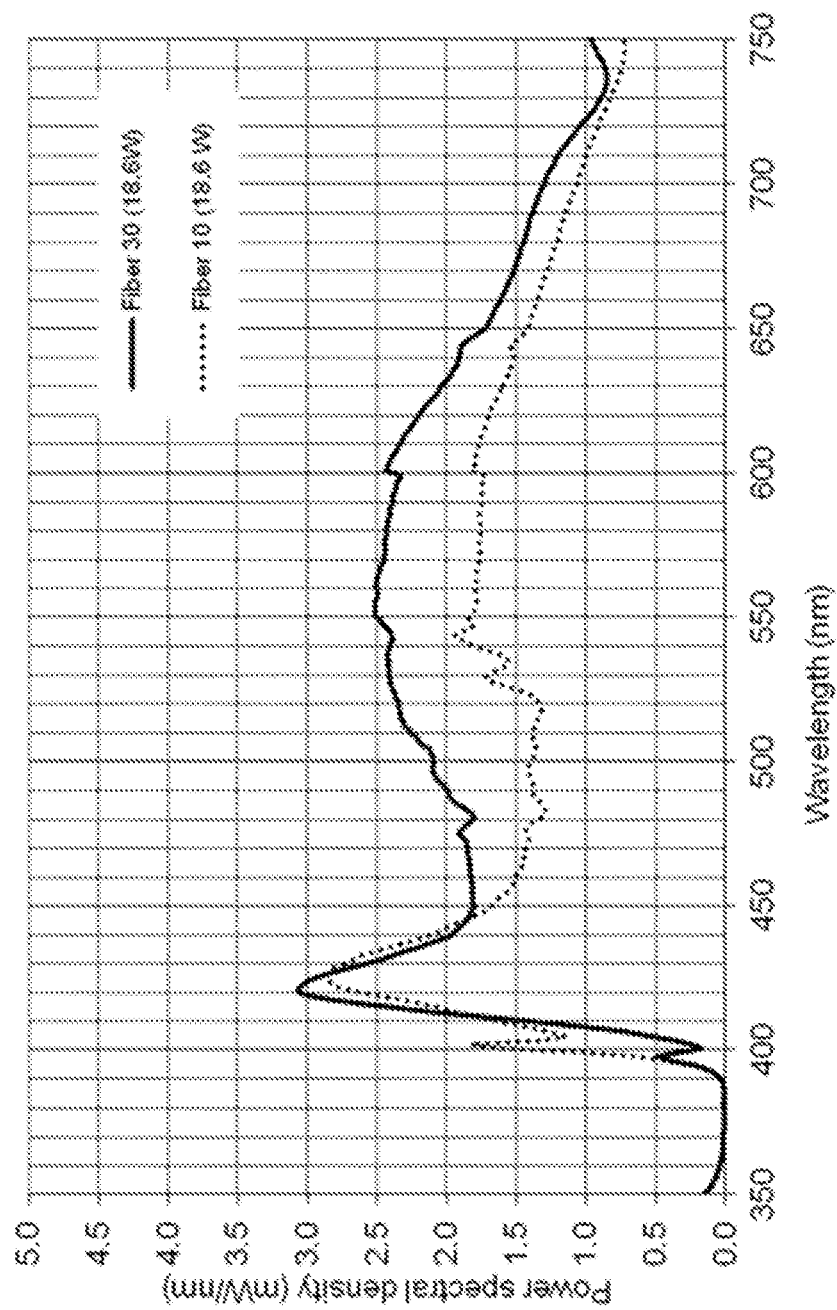
FIGS. 6a and 6b show graphs of power spectral density for a standard microstructured optical fiber and for a microstructured fiber according to the invention, for two different pump power levels.
Figure 6B:
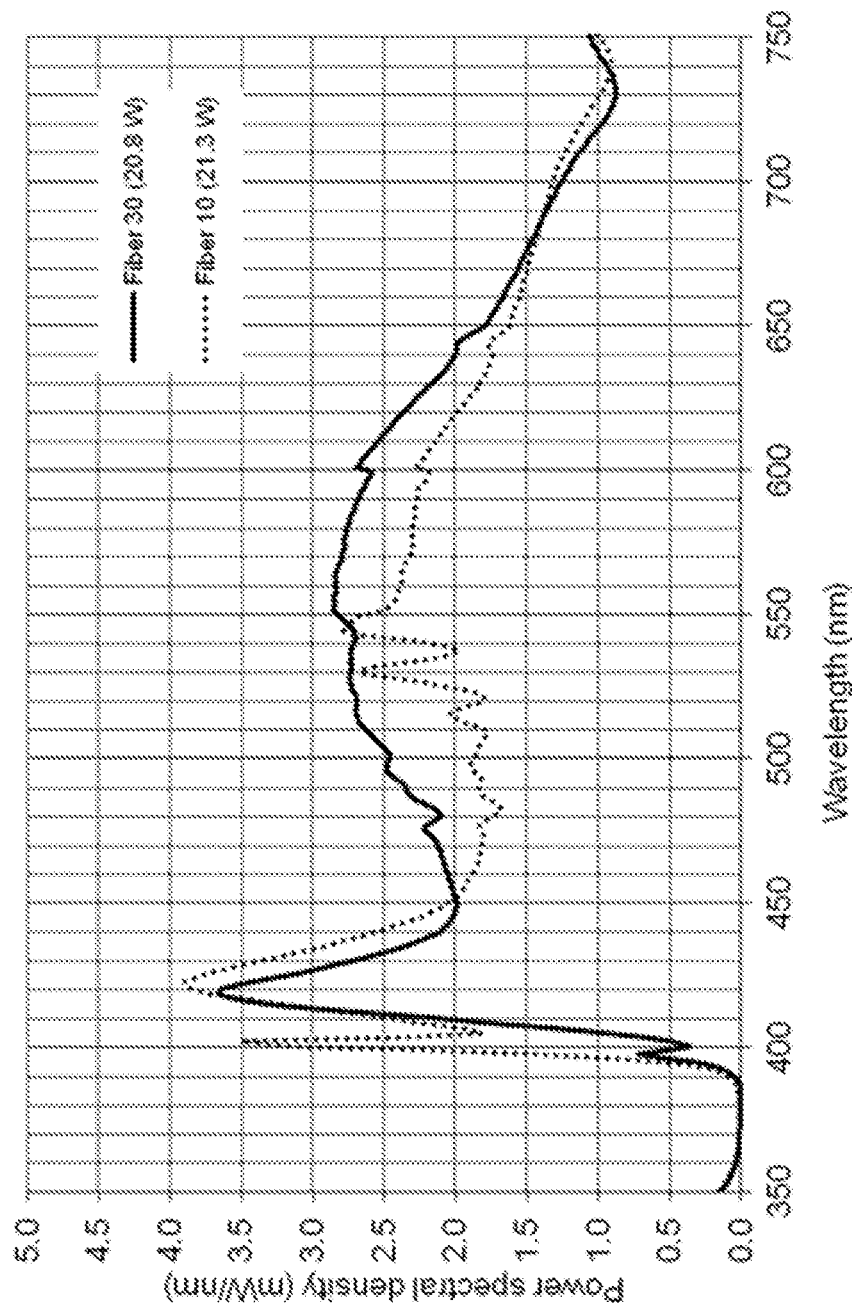

FIGS. 6a and 6b show graphs of power spectral density for a standard microstructured optical fiber 10 and for a microstructured fiber 30 according to the invention, for a two different pump power levels. FIGS. 6a and 6b show the power spectral density for only a part of the supercontinuum spectrum, viz. the range from 350 nm to 750 nm. In FIG. 6a the graphs are shown for the pump power level 18.6 W, and in FIG. 6b the graphs are shown for the pump power level 21.3 W for the standard microstructured optical fiber 10 and the pump power level 20.8 W for the microstructured optical fiber 30 according to the invention.

In FIG. 6a it is seen that the power spectral density for a given wavelength is greater for the microstructured optical fiber 30 according to the invention than for the microstructured optical standard fiber 10 for a wavelength range between 410 nm and 750 nm. Moreover, FIG. 6a shows that the spectrum, at least in the wavelength range between about 450 nm and about 650 nm is flatter for the microstructured optical fiber 30 according to the invention than the standard microstructured optical fiber 10. This effect is more pronounced at the power spectral density graphs of FIG. 6b corresponding to a higher pump power. Even though the pump powers used for the standard microstructured optical fiber 10 and the microstructured optical fiber 30 according to the invention are not identical, they are at least comparable. In FIG. 6b it is seen that the power spectral density from the standard microstructured optical fiber 10 has quite a variation as a function of wavelength, in particular in the wavelength range between 475 nm and 575 nm. The microstructured optical fiber 30 according to the invention has a much flatter spectrum in this wavelength range between 475 nm and 575 nm. Moreover, the power spectral density is higher for standard microstructured optical fiber 30 than for the standard microstructured optical fiber 10, even though the pump power level of the microstructured optical fiber 30 according to the invention is lower than that of the standard microstructured optical fiber 10 (viz. 20.8 W for the microstructured optical fiber 30 according to the invention and 21.3 W for the standard microstructured optical fiber).

Figure 7:
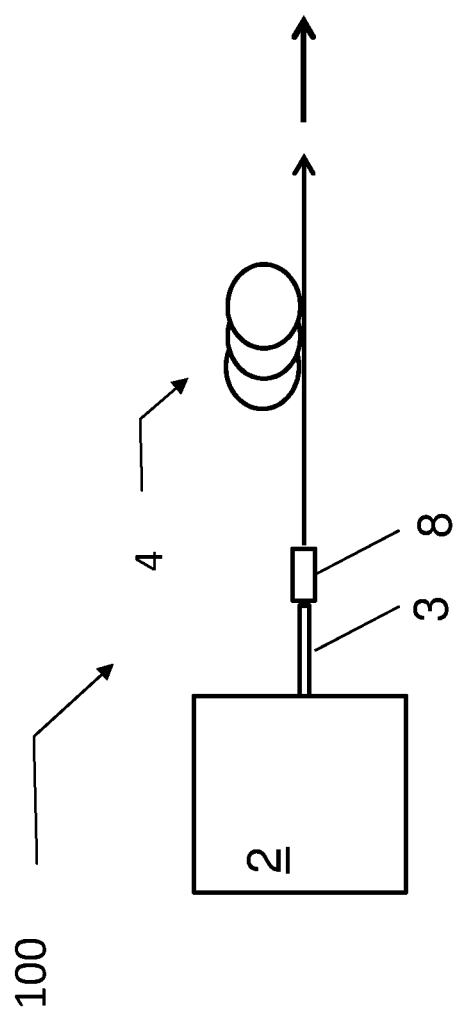
FIG. 7 is a schematic representation of a source of supercontinuum radiation according to the invention.

FIG. 7 is a schematic representation of a source 100 of supercontinuum radiation according to the invention. The supercontinuum light source 100 comprises a microstructured optical fiber 4 and a pump light source 2. The microstructured optical fiber has two ends: an input end and an output end. In FIG. 7, the input end of the fiber has an end cap 8, and the output end of the fiber is the other end of the fiber 4, viz. the end of the fiber not shown with the end cap. In FIG. 7, the end cap 8 is shown as if it is larger than the optical fiber 4; however, this is not necessarily the case, in that the end cap could have dimensions similar to those of the optical fiber 4. Even though the output end of the optical fiber 4 is shown as if it is a free end, the output end could have an end cap, or it could be spliced to further equipment.

The pump light source 2 has an output 3 arranged to feed light into the end cap 8 of the microstructured optical fiber 4. The light is fed into the microstructured optical fiber via the end cap 8, wherein a supercontinuum spectrum is created and output from the opposing end of the microstructured optical fiber as indicated by the arrow.

Figure 8:
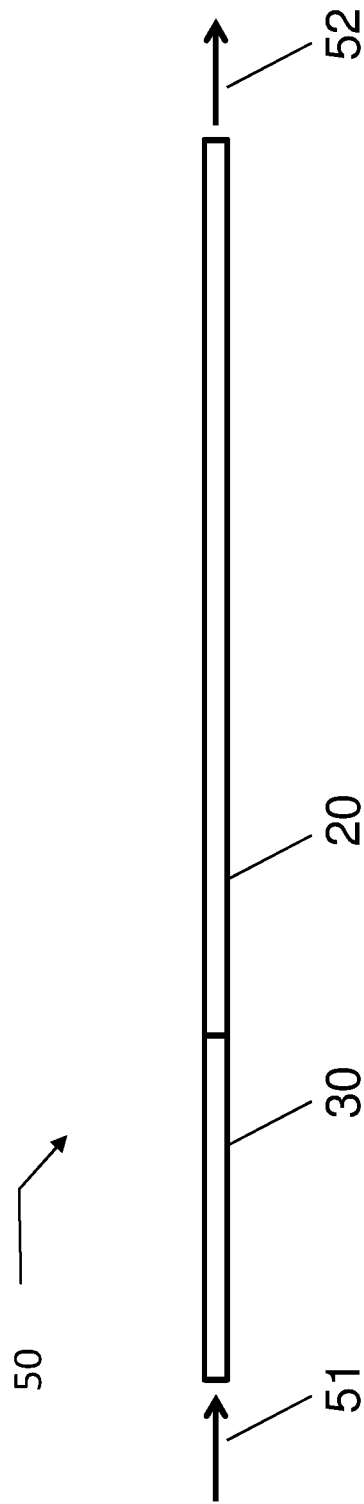
FIG. 8 shows an embodiment of a cascade fiber 50 according to the invention.

FIG. 8 shows an embodiment of a cascade fiber 50 according to the invention.

The cascade optical fiber (50) comprises two optical fibers 30, 20 spliced together or optical connected to each other by other means. At least one of the fibers is a microstructured optical fiber according to the invention. The other fiber or the second fiber is an optical fiber comprising a second core region that is capable of guiding light along a longitudinal axis of second fiber and a second cladding region surrounding the second core region, The dimension of the fibers 30 and 20 are chosen such that a mode field diameter of the microstructured optical fiber 30 is larger than a mode field diameter of the microstructured optical fiber 20.

Figure 9:
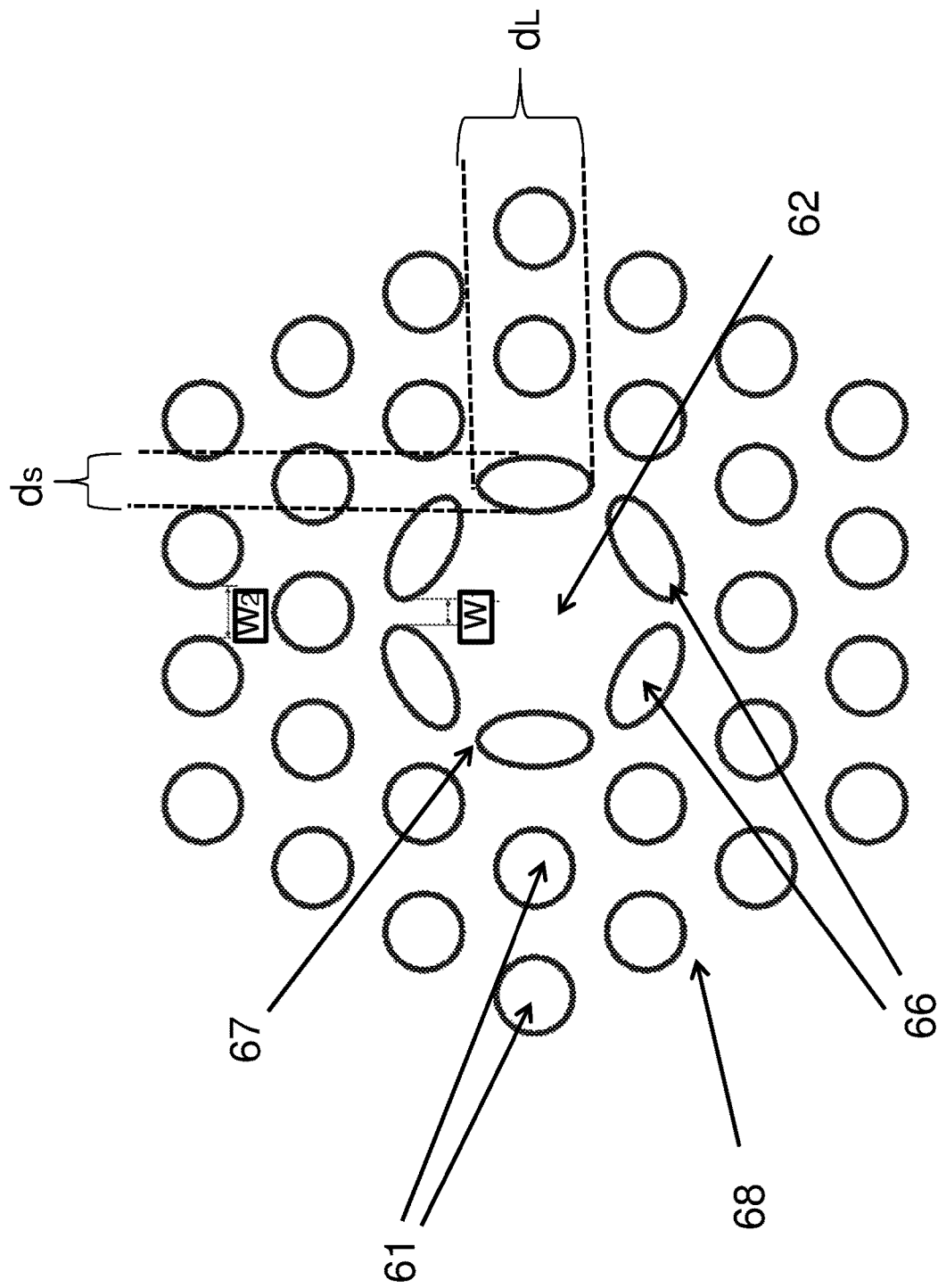
FIG. 9 is a schematic representation of an embodiment of a microstructured optical fiber according to the invention with oval inner cladding features.
Figure 10:
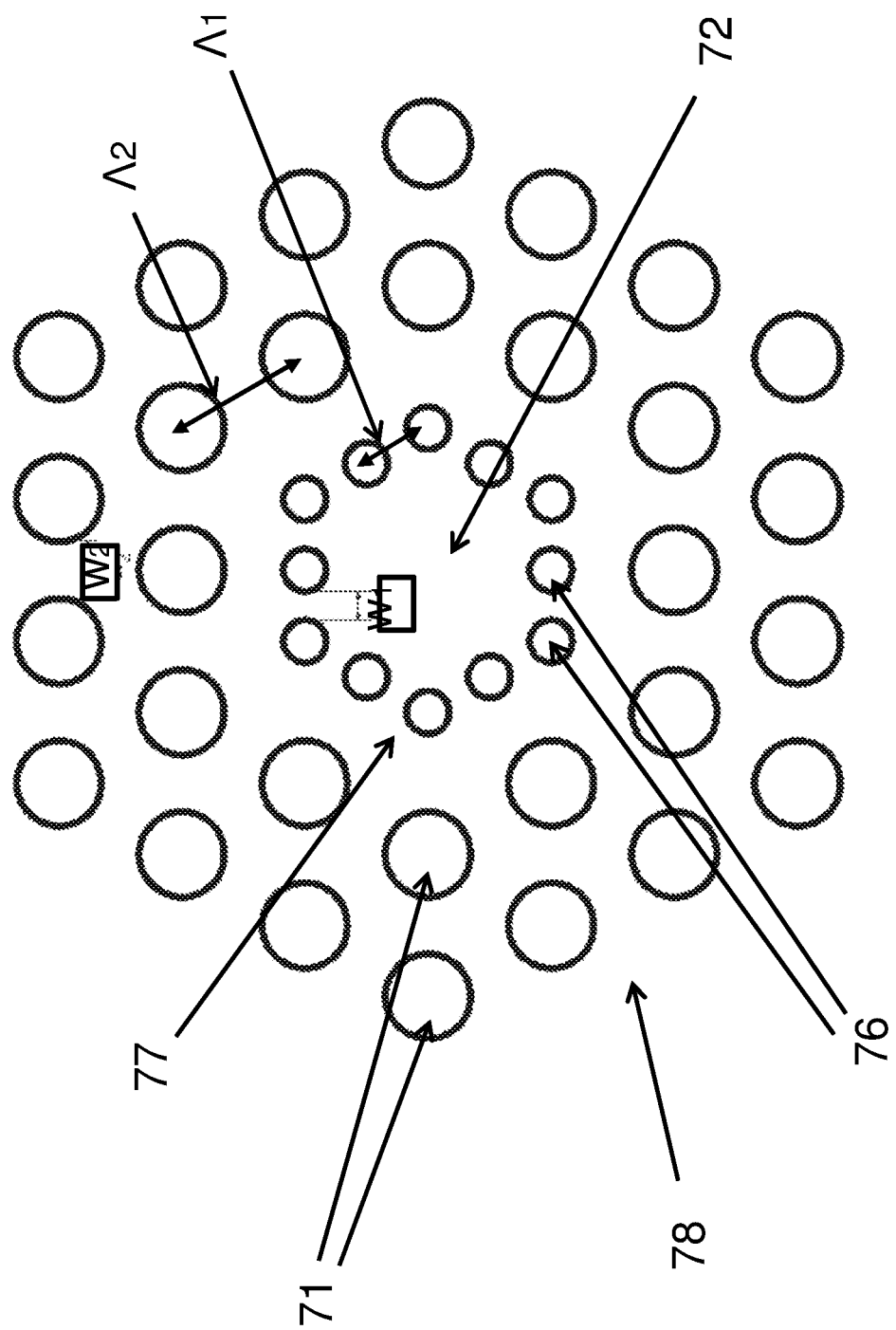
FIG. 10 is a schematic representation of an embodiment of a microstructured optical fiber according to the invention with a smaller inner cladding pitch than outer cladding pitch.

In the example shown in FIG. 8, both of the two optical fibers are optical fibers according to the invention, for example the fibers 30 and 20 shown in FIGS. 3a-3b and FIGS. 2a-2b, respectively or the fibers shown in FIG. 9 or 10 respectively. However, one of the fibers of the cascade optical fiber could for example be a multi-mode fiber and/or a microstructured optical fiber wherein the cladding has cladding features each of substantially identical size. The arrow 51 indicates light input into the fiber 50 whilst the arrow 52 indicates light output from the fiber 50.

The microstructured optical fiber shown in FIG. 9 comprises a core region (or simply referred to as core) 62 and a cladding region surrounding the core. The cladding region comprises a cladding background material and a plurality of cladding features 61, 66 within the cladding background material.

The cladding region comprises an inner cladding region 67 with a single inner ring of inner cladding features 66 and an outer cladding region 68 comprising 3 or more outer cladding rings of outer cladding features 61. Please observe that for simplifying the drawing only 2 rings of outer cladding features 62 are shown.

The bridges of background material between the features 66 of the inner cladding region 67 have a width $w_1$ and the bridges of background material between the features 61 of the outer cladding region 68 have a width $w_2$. It can be seen that $w_2$ is much larger than $w_1$ advantageously as described above.

The features 66 of the inner ring of the inner cladding region are oval with a larger diameter dL and a perpendicular smaller diameter dS, advantageously with an aspect ratio dS:dL of from about 1:1.2 to about 1:3 as described above.

The oval features 66 of the inner cladding region 67 are orientated with their smaller diameter dS in radial direction relative to the longitudinal axis of the optical fiber. As see the resulting thickness of the inner cladding region 67 is relatively low in the shown embodiment about 30% of the core diameter.

The microstructured optical fiber shown in FIG. 10 comprises a core region (or simply referred to as core) 72 and a cladding region surrounding the core. The cladding region comprises a cladding background material and a plurality of cladding features 71, 76 within the cladding background material.

The cladding region comprises an inner cladding region 77 with a single inner ring of inner cladding features 76 and an outer cladding region 78 comprising 3 or more outer cladding rings of outer cladding features 71. Please observe that for simplifying the drawing only 2 rings of outer cladding features 72 are shown.

The inner cladding features 76 of the inner cladding region 77 are arranged at a first pitch ($\Lambda_1$) and the outer cladding features 71 of the outer cladding 78 are arranged at a second pitch ($\Lambda_2$), wherein the second pitch is much larger than the first pitch. In the shown embodiment the second pitch ($\Lambda_2$) is about twice the first pitch ($\Lambda_1$).

The bridges of background material between the features 66 of the inner cladding region 67 have a width $w_1$ and the bridges of background material between the features 61 of the outer cladding 68 region have a width $w_2$. It can be seen that $w_2$ is much larger than $w_1$ advantageously as described above.

The features 76 of the single inner ring of the inner cladding region 77 have a characteristic diameter which is much smaller than the average diameter of the features 71 of the outer cladding region 78. In the shown embodiment the characteristic diameter of the features 76 of the single inner ring is about half the average diameter of the features 71 of the outer cladding region 78. As it can be seen the axial thickness of the inner cladding region is very narrow, thereby enabling an effective higher order mode stripping off.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these but may be embodied in other ways within the subject-matter defined in the following claims.

The invention claimed is:

1. A microstructured optical fiber having a length and a longitudinal axis along its length and comprising:
   a core region capable of guiding light along the longitudinal axis and a cladding region which surrounds the core region, the cladding region comprising a cladding background material and a plurality of cladding features within the cladding background material, the cladding features being arranged around the core region,
   wherein the cladding region comprises an inner cladding region comprising an innermost ring of cladding features and an outer cladding region comprises outer cladding rings of outer cladding features, where the outer cladding rings comprise at least three outer cladding rings, the innermost ring consisting of those cladding features being closest to the core region,
   wherein the rings of cladding features each comprise bridges of cladding background material separating adjacent features of the ring,
   wherein the bridges of the innermost ring have an average minimum width (w1), the minimum width of a bridge of a ring being the shortest distance between two adjacent features of the ring; and
   wherein the at least three outer cladding rings have an average minimum width (w2) of bridges that is larger than the average minimum width (w1) of the bridges of the innermost ring.

2. The microstructured optical fiber of claim 1, wherein the core region has a diameter of at least about 2 µm.

3. The microstructured optical fiber of claim 1, wherein the core region has a diameter larger than about 10 µm.

4. The microstructured optical fiber of claim 1, wherein the average minimum width (w1) of the bridges of the innermost ring is about 1.2 μm or less.

5. The microstructured optical fiber of claim 1, wherein the average minimum width (w2) of the bridges of the at least three outer rings is at least about 10% larger than the average minimum width (w1) of the bridges of the innermost ring.

6. The microstructured optical fiber of claim 1, wherein the cladding features of the innermost ring have a first characteristic diameter (d1) and wherein the outer cladding features have a characteristic diameter smaller than the first characteristic diameter (d1).

7. The microstructured optical fiber of claim 6, wherein the outer cladding features have a characteristic diameter which is at least about 10% smaller than the first characteristic diameter (d1).

8. The microstructured optical fiber of claim 1, wherein the cladding features of the innermost ring have a first characteristic diameter (d1) and wherein the average minimum width (w1) of the bridges of the innermost ring is smaller than the first characteristic diameter (d1).

9. The microstructured optical fiber of claim 1, wherein the core region has a substantially identical diameter along substantially the entire length of the fiber.

10. The microstructured optical fiber of claim 1, wherein the microstructured optical fiber is being configured to provide supercontinuum radiation including light at wavelengths below 500 nm when pumped by pump radiation generated by a pump laser source.

11. The microstructured optical fiber of claim 1, wherein the core region comprises a core background material which is doped with dopant material decreasing the refractive index of the core region compared to the core background material in undoped condition.

12. A source of optical supercontinuum radiation, the source comprising:
the microstructured optical fiber as recited in claim 1, and
a pump laser source adapted to generate pump radiation at a pump wavelength and to launch the pump radiation into the microstructured optical fiber at an input end thereof.

13. The source of optical supercontinuum radiation of claim 12, wherein the microstructured optical fiber is configured to provide supercontinuum radiation including light at wavelengths below 500 nm upon launch of the pump radiation into the microstructured optical fiber.

14. The source of optical supercontinuum radiation of claim 12, wherein the core region of the microstructured optical fiber has a diameter of at least about 2 μm.

15. The source of optical supercontinuum radiation of claim 12, wherein the bridges of the innermost ring of the microstructured optical fiber have an average minimum width (w1) of about 1.2 μm or less.

16. The source of optical supercontinuum radiation of claim 12, wherein the core region of the microstructured optical fiber comprises a core background material which is doped with dopant material decreasing the refractive index of the core region compared to the core background material in undoped condition.

17. The source of optical supercontinuum radiation of claim 12, wherein the average minimum width (w2) of the bridges of the at least three outer rings of the microstructured optical fiber is at least about 10% larger than the average minimum width (w1) of the bridges of the innermost ring.

18. The source of optical supercontinuum radiation of claim 12, wherein the microstructured optical fiber has a zero dispersion wavelength of from about 860 nm to about 1400 nm.

19. The source of optical supercontinuum radiation of claim 12, wherein the pump radiation comprises a pump wavelength which is between about 1000 nm and about 1100 nm and is up to about 200 nm above or below the zero dispersion wavelength of the microstructured optical fiber.

* * * * *